US009927782B2

United States Patent
Mohan et al.

(10) Patent No.: US 9,927,782 B2
(45) Date of Patent: *Mar. 27, 2018

(54) LOGICAL GROUPINGS OF MULTIPLE TYPES OF INTELLIGENT BUILDING FIXTURES

(71) Applicant: enLighted, Inc., Sunnyvale, CA (US)

(72) Inventors: Tanuj Mohan, Mountain View, CA (US); Michel Billard, Sunnyvale, CA (US); Joseph Basil Curasi, Morgan Hill, CA (US)

(73) Assignee: enLighted, Inc., Sunnyvale, CA (US)

( * ) Notice: Subject to any disclaimer, the term of this patent is extended or adjusted under 35 U.S.C. 154(b) by 492 days.

This patent is subject to a terminal disclaimer.

(21) Appl. No.: 14/280,620

(22) Filed: May 18, 2014

(65) Prior Publication Data

US 2014/0257572 A1    Sep. 11, 2014

Related U.S. Application Data

(63) Continuation-in-part of application No. 13/360,786, filed on Jan. 29, 2012, now Pat. No. 9,002,522.

(51) Int. Cl.
  *G05B 15/02* (2006.01)
  *H05B 37/02* (2006.01)

(52) U.S. Cl.
  CPC ......... *G05B 15/02* (2013.01); *H05B 37/0218* (2013.01); *H05B 37/0227* (2013.01); *H05B 37/0245* (2013.01); *Y02B 20/46* (2013.01); *Y02B 20/48* (2013.01)

(58) Field of Classification Search
  CPC ............... G05B 15/02; H05B 37/0245; H05B 37/0218; H05B 37/0227; Y02B 20/46; Y02B 20/48
  See application file for complete search history.

(56) References Cited

U.S. PATENT DOCUMENTS

| 4,751,399 A | 6/1988 | Koehring et al. |
| 5,101,141 A | 3/1992 | Warner et al. |
| 5,179,324 A | 1/1993 | Audbert |
| 5,191,265 A | 3/1993 | D'Aleo et al. |
| 5,283,516 A | 2/1994 | Lohoff |
| 5,293,097 A | 3/1994 | Elwell |
| 5,489,827 A | 2/1996 | Xia |
| 5,812,422 A | 9/1998 | Lyons |

(Continued)

*Primary Examiner* — Charles Kasenge
(74) *Attorney, Agent, or Firm* — Brian R. Short

(57) ABSTRACT

Methods, apparatuses and systems of a controllable receptacle are disclosed. One apparatus includes at least one switch, wherein the at least one switch connects an input power connection received by the controllable receptacle to a receptacle output when the at least one switch is closed, a motion sensor for sensing motion, a transceiver for communicating with other devices, and a controller. For an embodiment, the controller operative to determine an association of the controllable receptacle with a motion group, wherein the motion group comprises a plurality of devices, wherein the controller communicates with at least one of the plurality of devices, determines that the controllable receptacle is to be activated based on the motion sensor sensing motion or a motion sensor of a device of the motion group sensing motion, and closes the at least one switch when determining the controllable receptacle is to be activated.

25 Claims, 17 Drawing Sheets

(56) References Cited

U.S. PATENT DOCUMENTS

| | | | |
|---|---|---|---|
| 6,028,515 A * | 2/2000 | Eisinger | H05B 37/0227 340/540 |
| 6,057,654 A | 5/2000 | Cousy et al. | |
| 6,188,177 B1 | 2/2001 | Adamson et al. | |
| 6,188,181 B1 | 2/2001 | Sinha et al. | |
| 6,342,994 B1 | 1/2002 | Cousy et al. | |
| 6,548,967 B1 | 4/2003 | Dowling et al. | |
| 6,896,388 B2 | 5/2005 | George et al. | |
| 7,255,454 B2 | 8/2007 | Peterson | |
| 7,309,985 B2 | 12/2007 | Eggers et al. | |
| 7,315,258 B2 | 1/2008 | Dawson | |
| 7,348,736 B2 | 3/2008 | Piepgras et al. | |
| 7,437,596 B2 | 10/2008 | McFarland | |
| 7,382,271 B2 | 12/2008 | McFarland | |
| 7,550,931 B2 | 6/2009 | Lys et al. | |
| 7,566,137 B2 | 7/2009 | Veskovic | |
| 7,623,042 B2 | 11/2009 | Huizenga | |
| 7,688,005 B2 | 3/2010 | Reid | |
| 7,729,941 B2 | 6/2010 | Zampini, II et al. | |
| 7,792,956 B2 | 9/2010 | Choong et al. | |
| 7,845,823 B2 | 12/2010 | Mueller et al. | |
| 7,876,233 B2 | 1/2011 | Dawson et al. | |
| 7,925,384 B2 | 4/2011 | Huizenga et al. | |
| 7,948,189 B2 | 5/2011 | Ahmed | |
| 7,999,666 B2 | 8/2011 | Barrieau et al. | |
| 8,009,042 B2 | 8/2011 | Steiner et al. | |
| 8,077,035 B2 | 12/2011 | Reid et al. | |
| 8,083,367 B2 | 12/2011 | Anderson et al. | |
| 8,160,729 B2 | 4/2012 | Ahmed | |
| 8,376,567 B1 | 2/2013 | Zozula et al. | |
| 2002/0057204 A1 | 5/2002 | Bligh | |
| 2003/0189823 A1 | 10/2003 | George et al. | |
| 2004/0009700 A1 * | 1/2004 | Patel | H05B 37/0227 439/488 |
| 2004/0002792 A1 | 10/2004 | Hoffknecht | |
| 2005/0169643 A1 | 8/2005 | Franklin et al. | |
| 2006/0011843 A1 * | 1/2006 | Eskildsen | G08B 13/19 250/342 |
| 2006/0170376 A1 | 8/2006 | Piepgras et al. | |
| 2006/0275040 A1 | 12/2006 | Franklin | |
| 2007/0016331 A1 | 1/2007 | Fehr | |
| 2007/0057807 A1 | 3/2007 | Walters et al. | |
| 2007/0061050 A1 | 3/2007 | Hoffknecht | |
| 2007/0086128 A1 | 4/2007 | Lane et al. | |
| 2007/0132604 A1 | 6/2007 | Harwood | |
| 2007/0145915 A1 | 6/2007 | Roberge et al. | |
| 2007/0152808 A1 | 7/2007 | LaCasse | |
| 2007/0189001 A1 | 8/2007 | Nielson et al. | |
| 2007/0215794 A1 | 9/2007 | Cernasov et al. | |
| 2008/0136356 A1 | 6/2008 | Zampini et al. | |
| 2008/0185597 A1 | 8/2008 | Veskovic et al. | |
| 2008/0185977 A1 | 8/2008 | Veskovic et al. | |
| 2008/0244104 A1 | 10/2008 | Clemente | |
| 2008/0265796 A1 | 10/2008 | Null | |
| 2009/0026966 A1 | 1/2009 | Budde et al. | |
| 2009/0179596 A1 | 7/2009 | Willaert et al. | |
| 2009/0195161 A1 | 8/2009 | Lane et al. | |
| 2010/0034386 A1 | 2/2010 | Choong et al. | |
| 2010/0135186 A1 | 6/2010 | Choong et al. | |
| 2010/0188023 A1 | 7/2010 | Anderson et al. | |
| 2010/0264846 A1 | 10/2010 | Chemal et al. | |
| 2010/0270933 A1 | 10/2010 | Chemal et al. | |
| 2010/0295482 A1 | 11/2010 | Chemal et al. | |
| 2010/0301777 A1 | 12/2010 | Chemal et al. | |
| 2011/0031897 A1 | 2/2011 | Henig et al. | |
| 2011/0063101 A1 * | 3/2011 | Cristoforo | G08B 21/14 340/501 |
| 2011/0080529 A1 * | 4/2011 | Wong | G06F 3/011 348/734 |
| 2011/0199010 A1 | 8/2011 | Henig et al. | |
| 2012/0038479 A1 | 2/2012 | Ten Wolde | |
| 2012/0112666 A1 * | 5/2012 | Bennette | H05B 37/0218 315/307 |
| 2012/0126700 A1 | 5/2012 | Mayfield et al. | |
| 2012/0142204 A1 * | 6/2012 | Eberhard | H01R 13/70 439/188 |
| 2012/0293013 A1 * | 11/2012 | Parsons | H05B 37/0227 307/113 |
| 2014/0104500 A1 * | 4/2014 | Wong | G06F 3/011 348/734 |
| 2014/0132084 A1 * | 5/2014 | Pham | H01R 24/78 307/140 |
| 2014/0180486 A1 * | 6/2014 | Newman, Jr. | G06F 1/325 700/295 |
| 2015/0057825 A1 * | 2/2015 | Steele | H02J 4/00 700/297 |

* cited by examiner

Determining an association of the controllable receptacle with a motion group, wherein the motion group comprises a plurality of devices, wherein the controller communicates with at least one of the plurality of devices

610

Determining that the controllable receptacle is to be activated based on the motion sensor sensing motion or a motion sensor of at least one of the plurality of devices of the motion group sensing motion

620

Closing the at least one switch when determining the controllable receptacle is to be activated

Each of a plurality of independently controlled lighting fixtures sensing light and/or motion, and independently controlling an intensity of light of the lighting fixture
1610

Specifying one or more of the plurality of independently controlled lighting fixtures as belonging to a logical group
1620

Each of the lighting fixtures of the logical group additionally controlling the intensity of light of the lighting fixture based on sensing of light and/or motion of another lighting fixture of the logical group
1630

FIGURE 16

```
┌─────────────────────────────────────────────────────────────────────────────┐
│ Each of a plurality of independently controlled temperature apparatuses     │
│ sensing light, motion and/or temperature, and independently controlling a   │
│ temperature                                                                 │
│                                  1710                                       │
└─────────────────────────────────────────────────────────────────────────────┘
                                      │
┌─────────────────────────────────────────────────────────────────────────────┐
│ Specifying one or more of the plurality of independently controlled         │
│ temperature apparatuses as belonging to a logical group                     │
│                                  1720                                       │
└─────────────────────────────────────────────────────────────────────────────┘
                                      │
┌─────────────────────────────────────────────────────────────────────────────┐
│ Each of the temperature apparatuses of the logical group additionally       │
│ controlling temperature based on sensing of light, motion and/or            │
│ temperature of another temperature apparatus of the logical group           │
│                                  1730                                       │
└─────────────────────────────────────────────────────────────────────────────┘
```

FIGURE 17

LOGICAL GROUPINGS OF MULTIPLE TYPES OF INTELLIGENT BUILDING FIXTURES

RELATED APPLICATIONS

This patent application is a continuation-in-part of U.S. patent application Ser. No. 13/360,786 filed Jan. 29, 2012, which is herein incorporated by reference.

FIELD OF THE EMBODIMENTS

The described embodiments relate generally to building controls. More particularly, the described embodiments relate to logical groupings of intelligent building fixtures for controlling light, building environment or building security.

BACKGROUND

Building control systems are continually being developed. Building control systems can provide intelligence within a building or structure for improving energy use, user comfort and building security. The complexity of buildings and their control systems have evolved to automatic systems with central points of control. The most common building control systems provide control of lighting and heating. However, control systems for fire and security have become more prevalent as these areas have become more important.

As control systems have become more complex, the technique has always been to provide a central control point which relies on many outlying sensors as this has been the most straight-forward and easily implemented solution. These centralized control systems have always suffered from several serious problems. The largest problem has been failures of the control point itself causing a complete system failure. Various attempts have been tried to introduce redundant control points which add complexity to the control system along with introducing additional failure points.

Other failures occur in the areas of communications, sensors or actuators. These centralized networks have much difficulty in overcoming failures of this type as each system has been manually balanced at the time of set-up.

Centrally controlled building systems can be disadvantageous because all decision making occurs at the controller. Therefore, if the controller becomes inoperative, all devices in the system are no longer under automated control and some or all may not operate even manually. Similarly, if a connection to or from the controller is severed the devices served by that connection are no longer under automated control and also may not operate manually. Partial or system-wide functional changes, such as an immediate need to override current system settings (for example, during a fire or other emergency), cannot be made from anywhere but the controller.

Centrally controlled systems are fundamentally limited when attempting to expand or scale the controlled systems. More specifically, it is expensive to expand and the systems typically require significantly more power to operate.

It is desirable have methods, apparatuses and systems for providing building controls that are easy to expand in size, and do not require excessive amounts of power to operate.

SUMMARY

One embodiment includes a controllable receptacle. The controllable receptacle includes at least one switch, wherein the at least one switch connects an input power connection received by the controllable receptacle to a receptacle output when the at least one switch is closed, a motion sensor for sensing motion proximate to the controllable receptacle, a transceiver for communicating with other devices, and a controller. For an embodiment, the controller is operative to determine an association of the controllable receptacle with a motion group, wherein the motion group comprises a plurality of devices, wherein the controller communicates with at least one of the plurality of devices, determines that the controllable receptacle is to be activated based on the motion sensor sensing motion or a motion sensor of at least one of the plurality of devices of the motion group sensing motion, and closes the at least one switch when determining the controllable receptacle is to be activated.

Another embodiment includes a building control system. The building control system includes a plurality of building fixtures, wherein at least one of the building fixtures includes a controllable receptacle, and at least one of the building fixtures does not includes the controllable receptacle, and at least one sensor interfaced with at least one of the plurality of building fixtures. Further, the at least one of the building fixtures that does not include controllable receptacle includes a communication port and a controller. The controller is operative to independently control at least one of an environmental load or a security device, either receive or help designate the building fixture as belonging to a logical group of the plurality building fixtures, and share at least one of sensor or state information with other building fixtures within the logical group of the plurality of building fixtures, through the communication port. Further, the at least one controllable receptacle includes at least one switch, wherein the at least one switch connects an input power connection received by the controllable receptacle to a receptacle output when the at least one switch is closed, a transceiver for communicating with other building fixtures, at least one receptacle sensor, and a receptacle controller. The receptacle controller is operative to determine an association of the controllable receptacle with the logical group, wherein the receptacle controller communicates with at least one of the building fixtures of the logical group, determine that the controllable receptacle is to be activated based on the receptacle sensor sensing motion or a motion sensor of at least one of the building fixtures of the logical group sensing motion, and closing the at least one switch when determining the controllable receptacle is to be activated.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 6 is a flow chart that includes steps of a method of operating a controllable receptacle within a motion group, according to an embodiment.

FIG. 16 is a flow chart that includes steps of another example of a method of an intelligent light controller controlling a light.

FIG. 17 is a flow chart that includes steps of another example of a method of an intelligent light controller controlling a light.

DETAILED DESCRIPTION

The described embodiments are embodied in methods, apparatuses and systems for logical groupings of building fixtures, wherein the groupings include multiple types of building fixtures. At least some embodiments of the fixtures include controllable receptacles, and lighting fixtures, while other embodiments include environmental control apparatuses, such as, heating, ventilation and air conditioning (HVAC) devices, and other embodiments include security controls.

At least some of the embodiments of the building fixtures provide independent, intelligent building controls. The intelligence of each individual building fixture can be enhanced through communication with other building fixtures of logical groupings of the building fixtures. The logical groupings can be designated in one or more ways, and each building fixture of a logical group can utilizing sensed information from one or more of the other building fixtures of the logical group. These embodiments allowing for easy, efficient scaling of building control.

At least some of the described embodiments provide building control systems that operate with distributed intelligence, thereby eliminating problems of the prior building systems. The described embodiments move the intelligence from a central point to the building fixtures themselves.

Embodiments of the building fixtures include devices that are attached to the walls or ceilings of a structure and are used to provide environmental services such as heat or light, or security services such as surveillance or fire protection. Embodiments of the building fixtures can be installed by construction crews in new or remodeled buildings, but can be added as necessary later. The most common fixtures are light fixtures, heating or cooling vents, fans, security cameras, or fire alarms and sensors.

The advent of low-cost microprocessor controllers has allowed the control point to be replicated into each fixture along with communications between controllers, so that centralized control points are no longer needed. The fixtures are now able to operate separately, or in logical groups to control the environment. User control points can be provided as required to allow a user to control one or more logical groupings of fixtures. User control points simply communicate with the network of fixtures to provide the necessary control information. Also system administrators can manage the building functions by setting up or changing logical groupings of fixtures as required, enabling proper system operation. Finally, the networks of the describe embodiments provide built-in redundancy, as failed sensors or fixtures can be neutralized and alarmed to keep the fixture network functioning properly.

Figure 1:
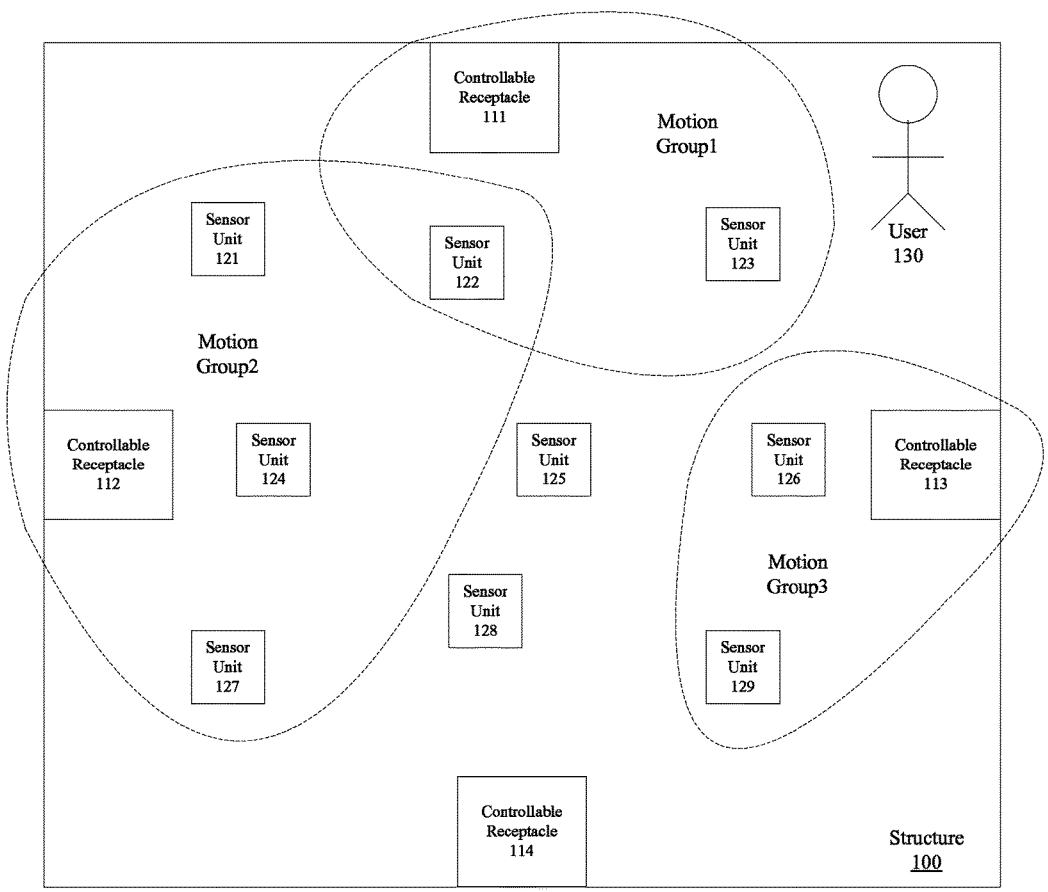
FIG. 1 shows a structure that includes multiple types of building control fixtures, wherein multiple fixtures are included within logical groups, according to an embodiment.

FIG. 1 shows a structure 100 that includes multiple types of building control fixtures (including controllable receptacles 111, 112, 113, 114, and sensor units 121-129), wherein multiple fixtures are included within logical groups (such as, motion group 1, motion group 2 and motion group 3), according to an embodiment. Building control units within a particular motion group are operable to control a parameter (such as, provide power, control lighting and/or another environmental control) based on sensing of a condition (such as, motion) by at least one other building control unit within the logical group. One exemplary logical group is a motions sensing group. The motion of a user 130, for example, may be sensed.

For an embodiment, a controllable receptacle 112 controls power provided by an outlet of the controllable receptacle 112 based on motion sensed by another one of the building control units of the motion group 2. Further, for an embodiment, the controllable receptacle 112 includes its own motion sensor as well. For at least some embodiments, the controllable receptacle 112 controls power to its outlet based on either sensing motion itself, or another one of the building control units of the motion group 2 sensing motion. Further, for an embodiment, the controllable receptacle 112 indicates to other building control units of the motion group 2 that it has sensed motion.

For an embodiment, any one of the building control units can be a member of multiple motion sensing groups. For example, as shown in FIG. 1, the sensor unit 122 belongs to multiple motion sensing groups (motion group 1 and motions group 2). Though not shown, a single controllable receptacle can belong to multiple motion groups as well.

Figure 2:
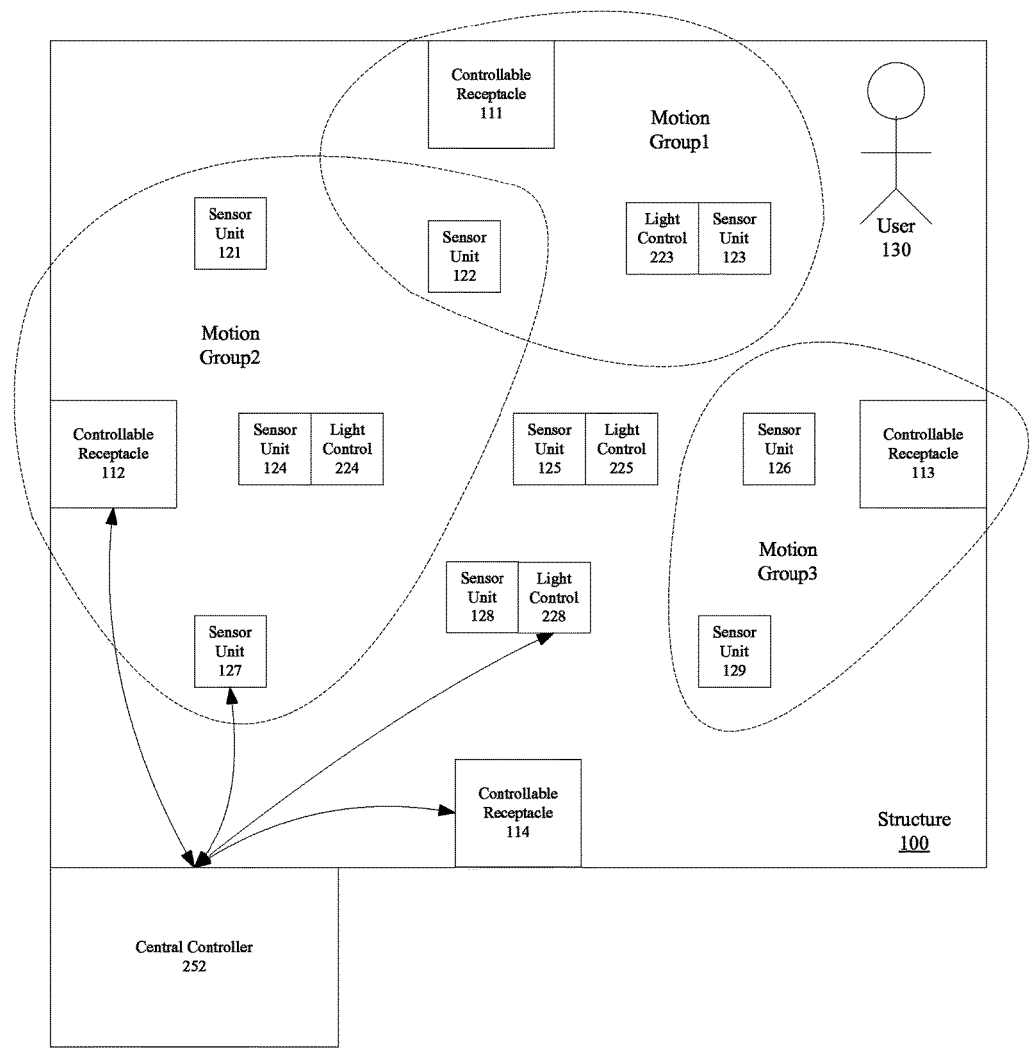
FIG. 2 shows a structure that includes multiple types of building control fixtures, wherein multiple fixtures are included within logical groups, according to another embodiment.

FIG. 2 shows a structure 100 that includes multiple types of building control fixtures (including controllable receptacles 111, 112, 113, 114, and sensor units 121-129), wherein multiple fixtures are included within logical groups, according to another embodiment. As shown, at least some of the sensor units 123, 124, 125, 128 have associated light controllers 223, 224, 225, 228. For at least some embodiments, the light controllers 223, 224, 225, 228 controls light associated with each of the light controllers 223, 224, 225, 228.

For an embodiment, one or more sensor units and associated light controllers are within a motion group along with one or more controllable receptacles. For example, the motion group 1 includes the controllable receptacle 111, the sensor unit 123 and associated light controller 223, and the sensor unit 122. As such, the controllable receptacle 111 controls power to its output based on motion sensed by either the controllable receptacle itself, motion sensed by the sensor unit 122, or motion sensed by the sensor unit 123. Further, for at least some embodiments, the light controller 223 controls light intensity of an associated light based on sensing motion by its own sensor unit 123, the sensor unit 122, or by the motion sensor of the controllable receptacle 111.

For an embodiment, one or more of the controllable receptacles, the sensor units, and/or the light controllers are operable to communicate with a backend or central server 252. The central controller 252 can collect sensor information for one or more sensors of one or more of the motion groups.

Figure 3:
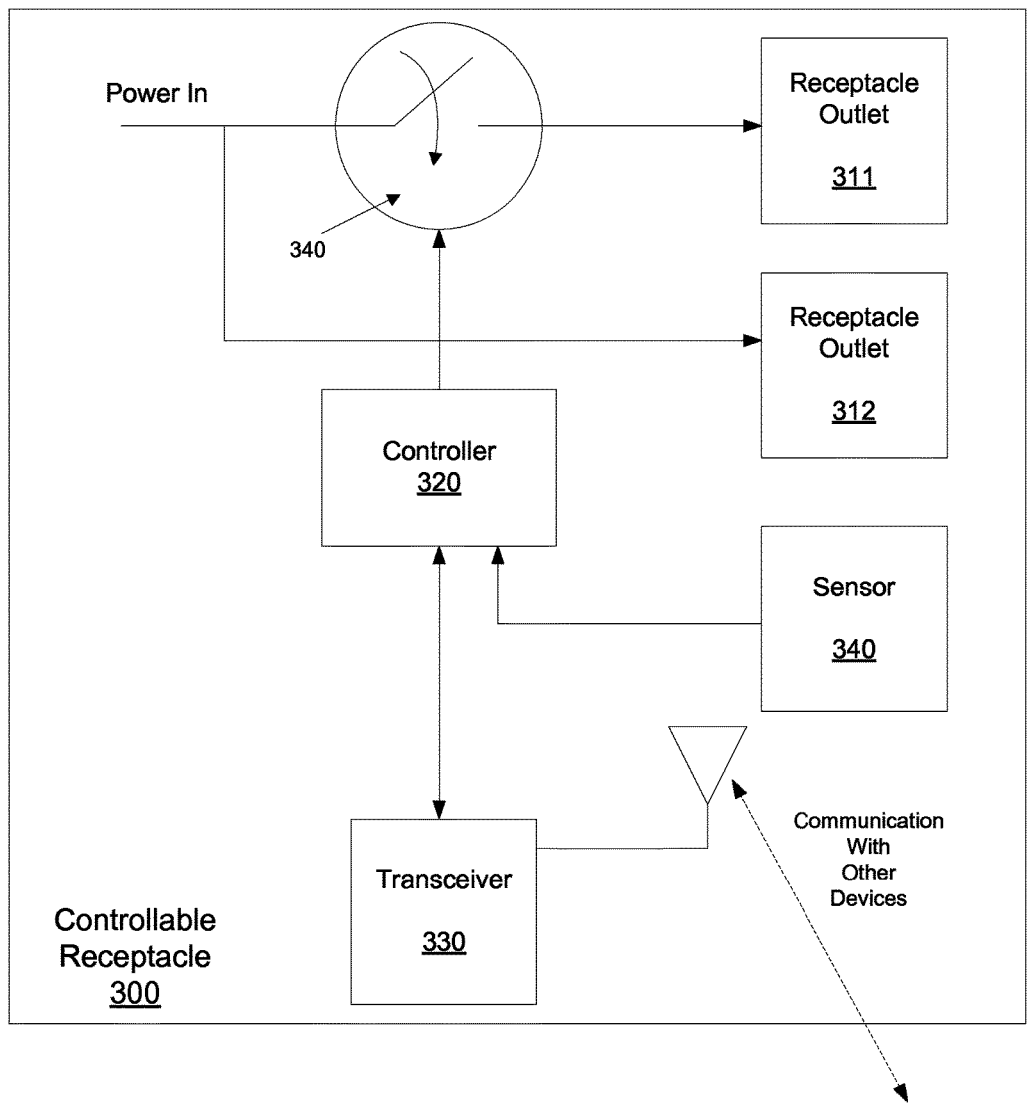
FIG. 3 shows a controllable receptacle, according to an embodiment.

FIG. 3 shows a controllable receptacle 300, according to an embodiment. For this embodiment, the controllable receptacle 300 includes at least one switch 340, a controller 320, receptacle outputs 311 and 312, a sensor 340, and a transceiver 330. For an embodiment, the controller 320 provides power to one or more of the outputs 311, 312 by closing the switch 340.

For an embodiment, the sensor 340 includes a motion sensor. Further, the controller 320 provides power to one or more of the outputs 311, 312 by closing the switch 340 when the sensor 340 senses motion proximate to the controllable receptacle 300, and/or another building control unit (such as, another receptacle or a sensor unit within the same motion group) senses motion.

The transceiver 330 allows the controller 320 of the controllable receptacle 300 to communicate with a central or backend server, a network, and/or other building control units.

For at least some embodiments, the controllable receptacle 300 includes at least one switch (such as, switch 340), wherein the at least one switch connects an input power connection received by the controllable receptacle 300 to a receptacle output (such as, receptacle outputs 311, 312) when the at least one switch is closed. Further, the controllable receptacle includes a motion sensor (such as, sensor 340) for sensing motion proximate to the controllable receptacle 300. Further, the controllable receptacle 300 includes a transceiver (such as, transceiver 330) for communicating with other devices.

Further, the controller 320 operative to determine an association of the controllable receptacle 300 with a motion group, wherein the motion group comprises a plurality of devices, wherein the controller 320 communicates with at least one of the plurality of devices, determine that the controllable receptacle is to be activated based on the motion sensor sensing motion or a motion sensor of at least one of the plurality of devices of the motion group sensing motion, and close the at least one switch when determining the controllable receptacle is to be activated.

For an embodiment, the transceiver includes a radio, and the communication between the controllable receptacle 300 and other devices is wireless.

For an embodiment, the sensor 340 includes a motion sensor that includes an ambient light sensor.

For an embodiment, controllable receptacle 300, further includes an air quality monitor (AQM). For an embodiment, the AQM senses a level of $CO_2$. For at least some, the controller 320 is further operative to identify a likelihood of fire within a structure in which the controllable receptacle is located based on either sensed motion or a lack of sensed motion, and the sensed level of $CO2$.

For an embodiment, the motion sensor includes a passive infrared (PIR) sensor, and wherein identifying the likelihood of fire is further dependent on sensing of thermal heat by the PIR sensor.

Figure 4:
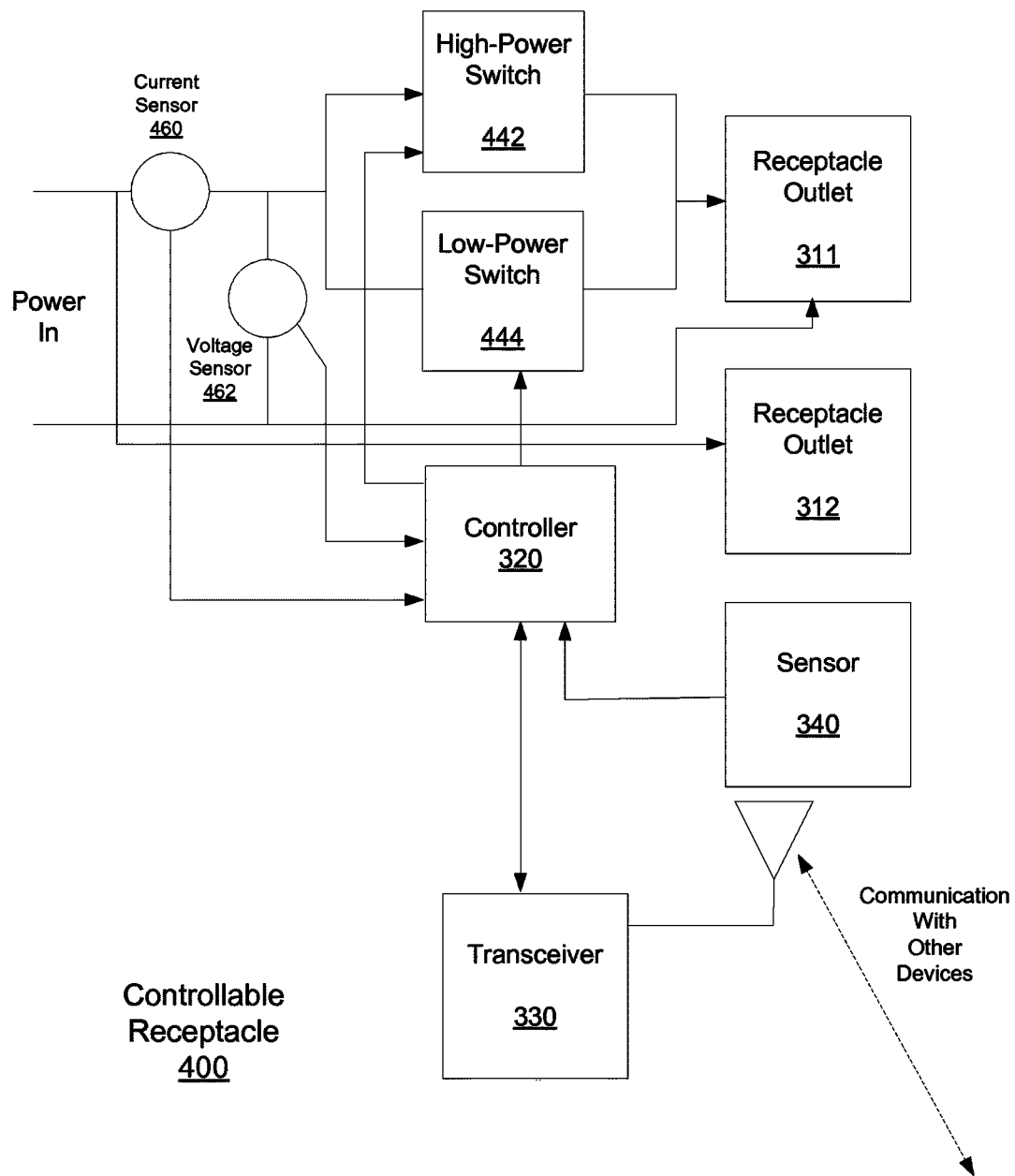
FIG. 4 shows a controllable receptacle, according to another embodiment.

FIG. 4 shows a controllable receptacle 400, according to another embodiment. This embodiment includes a primary switch 442, wherein the primary switch 442 connects the input power connection (Power In) received by the controllable receptacle 400 to the receptacle output (such as, receptacle outputs 311, 312) when the primary switch 442 is closed. This embodiment further includes a secondary switch 444, wherein the secondary switch 444 connects an input power connection (Power In) received by the controllable receptacle 400 to a receptacle output (such as, receptacle outputs 311, 312) when the secondary switch 444 is closed.

Further, this embodiment includes a current sensor 460, wherein the current sensor 460 senses a magnitude of current conducted through the controllable receptacle.

Further, for this embodiment, the controller 320 is further operative to determine that the controllable receptacle 400 is to be activated (for example, by the motion sensor of the controllable receptacle sensing motion, or other device within the motion group of the controllable receptacle sensing motion). Once the controller 320 determines the controllable receptacle is to be activated, the controller 320 closes the primary switch 442 while maintaining the secondary switch 444 open. Further, the controller 320 is operative to receive the magnitude of current being conducted through the controllable receptacle from the current sensor 460 for a period of time, and close the secondary switch 444 upon determining that the magnitude of the current conducted through the controllable receptacle 400 from the current sensor 460 for the period of time is within a predetermined range. For an embodiment, the primary switch 442 may then be opened.

The embodiment of FIG. 4 advantageously includes a robust (or abuse resistant) switch (which may be lossy) to establish that a load of the controllable receptacle 400 is within acceptable limits. That is, if when the controllable receptacle 400 is activated, the primary (the robust switch) is closed. If the load (at, for example, the output of the receptacle outlet 311) of the controllable receptacle 400 is a short circuit, the primary switch 442 is able to handle the high current load that results. Further, the controller 320 is operative to sense this condition, and de-activate the controllable receptacle 400. The primary switch is configured to withstand this high-current condition without being destroyed. However, if the load of the controllable receptacle 400 is well-behaved, then the secondary switch 444 is closed, and the primary switch 442 may or may not be opened.

For at least some embodiments, the primary switch 442 includes at least one of a triac, set of triacs, thyristors, IGBTs (insulated gate bipolar transistors), BJTs (bipolar junction transistors), and the secondary switch includes a relay. The primary switch needs to be able to withstand high-current conditions for at least a specified period of time without being destroyed or compromised.

As previously stated, the secondary switch 444 is closed upon determining that the magnitude of the current conducted through the controllable receptacle 400 from the current sensor 460 for the period of time is within a predetermined range. For an embodiment, the predetermined range includes the magnitude of the current conducted through the controllable receptacle being below a maximum threshold. For at least some embodiments, the predetermined range further includes the magnitude of the current conducted through the controllable receptacle being below the maximum threshold and above a minimum threshold.

For an embodiment, the primary switch and the secondary switch are opened if the current conducted through the controllable receptacle is above the maximum threshold.

Further, for an embodiment, the primary switch and the secondary switch are maintained as open for a predetermined period of time after determining that the current conducted through the controllable receptacle is above the maximum threshold.

For at least some embodiments, after the controllable receptacle is activated, a one of the low-power switch or the high-power switch remains close until the controller determines that the controller receptacle is to be de-activated, wherein when de-activated, both the low-power switch and the high-power switch are opened. For an embodiment, the controller receptacle is de-activated if a motion sensor of the controllable receptacle does not sense motion for a predetermined period of time. For an embodiment, the controller receptacle is de-activated if a motion sensor of the controllable receptacle does not sense motion for a predetermined period of time, and other devices of a motion group of the controllable receptacle do not sense motion for the predetermined period of time.

For at least some embodiments, the controller 320 receives a motion indicator through the transceiver 330 (radio) from at least one of the plurality of devices of the motion group. For at least some embodiments, the controller 320 is operative to determine that the controllable receptacle 400 is to be activated upon receiving the motion indicator from the at least one of the plurality of devices of the motion group. For at least some embodiments, the controller is operative to transmit a motion indicator through the radio to the plurality of devices of the motion group when the controllable receptacle senses motion proximate to the controllable receptacle.

For an embodiment, the receptacle output includes a plurality of power outputs, and wherein a power meter monitors a load of at least one of the power outputs. For an embodiment, the power meter is realized by the combination of the current sensor 460 and a voltage sensor 462. For an embodiment, the power meter characterized the load over time, and wherein the controller is further operative to identify load types and identify anomalies of load types.

Load Monitoring and Identification

For at least some embodiments, the monitoring by the power meter of the loads of the power outputs is utilized to characterize one or more device connected to the power outputs of the controllable receptacle. As previously stated, for an embodiment, the power meter is realized by the combination of the current sensor 460 and a voltage sensor 462.

For at least some embodiments, monitoring of the loads allows for the generation of power profiles of the loads. That is, for example, a laptop computer will have one identifiable profile and an overhead projector will have another identifiable profile. For at least some embodiments, different loads are identified based on their load profile. For at least some embodiments, the identification of load types allows for the generation of an itemized electrical power consumption over-view. For example, such an itemized electrical power consumption over-view includes how much power each type of device is using, and when such devices are being used. Additionally, the power profiles can identify how the types of device are being used. For example, a television may have a power consumption of 200 watts when powered-on, and a power consumption of 5 watts when turned-off. Such analyzed load behavior can be used to both identify the type of load (that is, the load being a television) and the operation of the load (on or off).

Further, at least some embodiments include correlating other observed behaviors with the power profiles of the loads. For example, the previously describe motion sensors and motion sensing can be correlated to the load profiles. That is, observer motion along with the profile of the power consumption or power use signature of the load can further be used to identify the type and use of a load.

At least some embodiments include utilizing the power profiles to estimate how many of different types of devices (such as, laptop computers, lights, overheads or other office or building devices) are being powered, how often they are powered, and further to specifically identify the device (that is, a certain manufacturer of the device and/or the device type).

Figure 5:
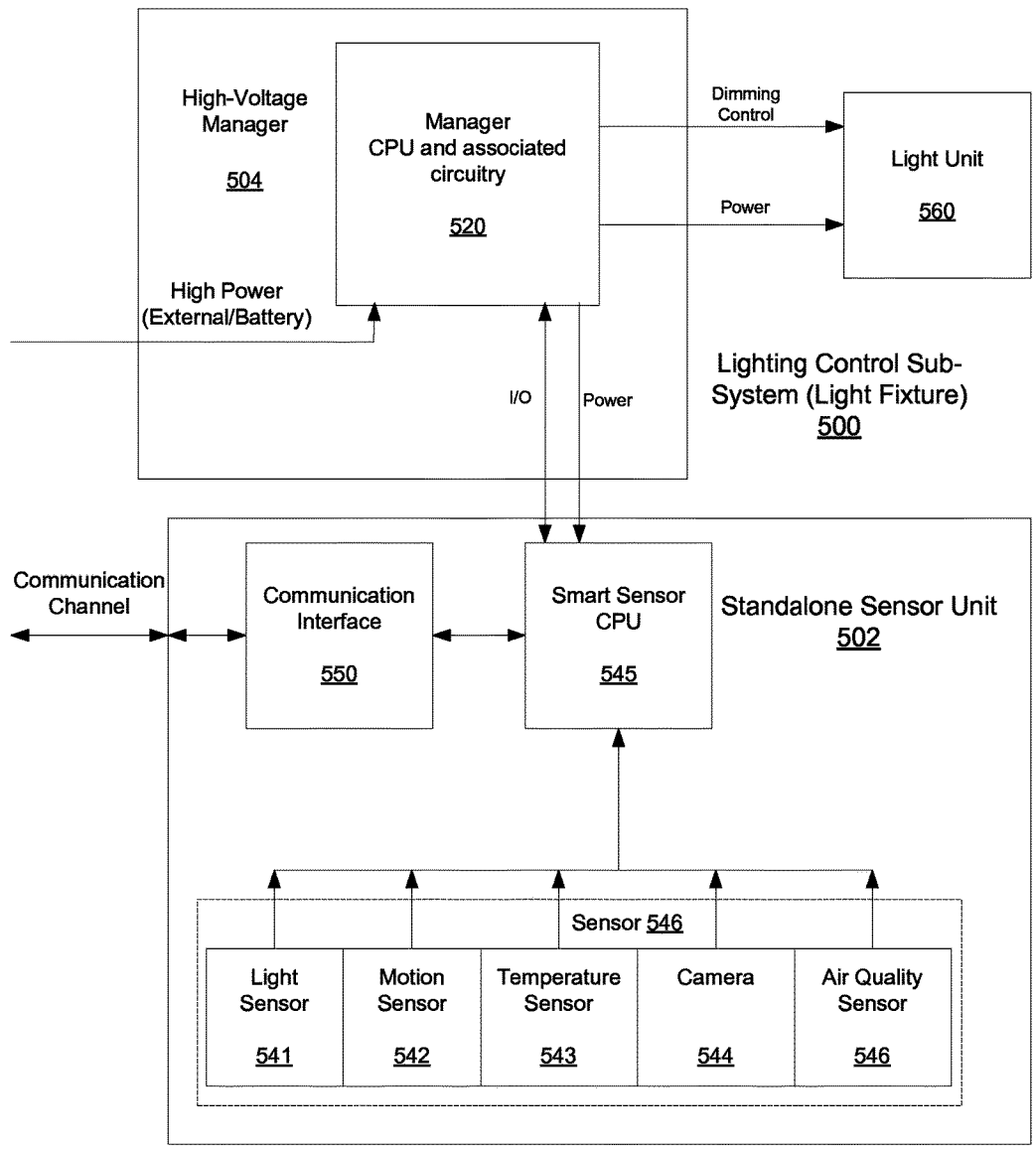
FIG. 5 shows a lighting control sub-system (lighting fixture), according to an embodiment.

FIG. 5 shows a lighting control sub-system (lighting fixture), according to an embodiment. For an embodiment, the sensors described include a smart sensor system 502. Further, a lighting control system 500 includes the smart sensor system 502 that is interfaced with a high-voltage manager 504, which is interfaced with a luminaire 560. The sensor and associated lighting control of FIG. 5 is one exemplary embodiment of the sensors utilized for sensing and/or tracking motion. Many different sensor embodiments are adapted to utilization of the described embodiments for sensing and/or tracking motion. For at least some embodiments, sensors that are not directly associated with light control are utilized.

The sensing and/or tracking of the described embodiments can be utilized for optimal control of lighting and other environmental controls of an area or structure that utilizes the motion tracking. The control can be configured to save energy and provide comfort to occupants of the area or structure.

The high-voltage manager 504 includes a controller (manager CPU) 520 that is coupled to the luminaire 560, and to a smart sensor CPU 545 of the smart sensor system 502. As shown, the smart sensor CPU 545 is coupled to a communication interface 550, wherein the communication interface 550 couples the controller to an external device. The smart sensor system 502 additionally includes a sensor 546. As indicated, the sensor 546 can include one or more of a light sensor 541, a motion sensor 542, and temperature sensor 543, and camera 544 and/or an air quality sensor 546. It is to be understood that this is not an exhaustive list of sensors. That is additional or alternate sensors can be utilized for occupancy and motion detection of a structure that utilizes the lighting control sub-system 500. The sensor 546 is coupled to the smart sensor CPU 545, and the sensor 546 generates a sensed input. For at least one embodiment, at least one of the sensors is utilized for communication with the user device.

For an embodiment, the temperature sensor 543 is utilized for motion tracking. For an embodiment, the temperature sensor 543 is utilized to determine how much and/or how quickly the temperature in the room has increased since the start of, for example, a meeting of occupants. How much the temperate has increased and how quickly the temperature has increased can be correlated with the number of the occupants. All of this is dependent on the dimensions of the room and related to previous occupied periods. For at least some embodiment, estimates and/or knowledge of the number of occupants within a room are used to adjust the HVAC (heating, ventilation and air conditioning) of the room. For an embodiment, the temperature of the room is adjusted based on the estimated number of occupants in the room.

According to at least some embodiments, the controllers (manager CPU 520 and the smart sensor CPU) are operative to control a light output of the luminaire 560 based at least in part on the sensed input, and communicate at least one of state or sensed information to the external device.

For at least some embodiments, the high-voltage manager 504 receives the high-power voltage and generates power control for the luminaire 560, and generates a low-voltage supply for the smart sensor system 502. As suggested, the high-voltage manager 504 and the smart sensor system 502 interact to control a light output of the luminaire 560 based at least in part on the sensed input, and communicate at least one of state or sensed information to the external device. The high-voltage manager 504 and the smart sensor system 502 can also receive state or control information from the external device, which can influence the control of the light output of the luminaire 560. While the manager CPU 520 of the high-voltage manager 504 and the smart sensor CPU 545 of the smart sensor system 502 are shown as separate controllers, it is to be understood that for at least some embodiments the two separate controllers (CPUs) 520, 545 can be implemented as single controller or CPU.

For at least some embodiments, the communication interface 550 provides a wireless link to external devices (for example, the central controller, the user device and/or other lighting sub-systems or devices).

An embodiment of the high-voltage manager 504 of the lighting control sub-system 500 further includes an energy meter (also referred to as a power monitoring unit), which receives the electrical power of the lighting control sub-system 500. The energy meter measures and monitors the power being dissipated by the lighting control sub-system 500. For at least some embodiments, the monitoring of the dissipated power provides for precise monitoring of the dissipated power. Therefore, if the manager CPU 520 receives a demand response (typically, a request from a power company that is received during periods of high power demands) from, for example, a power company, the manager CPU 520 can determine how well the lighting control sub-system 500 is responding to the received demand response. Additionally, or alternatively, the manager CPU 520 can provide indications of how much energy (power) is being used, or saved.

FIG. 6 is a flow chart that includes steps of a method of operating a controllable receptacle within a motion group, according to an embodiment. A first step 610 includes determining an association of the controllable receptacle with a motion group, wherein the motion group comprises a plurality of devices, wherein the controller communicates with at least one of the plurality of devices. A second step 620 includes determining that the controllable receptacle is to be activated based on the motion sensor sensing motion or a motion sensor of at least one of the plurality of devices of the motion group sensing motion. A third step 630 includes closing the at least one switch when determining the controllable receptacle is to be activated. For at least some embodiments, the at least one switch connects an input power connection received by the controllable receptacle to a receptacle output when the at least one switch is closed.

As previously mentioned, for at least some embodiments the motion sensor includes an ambient light sensor. At least some embodiments further include an air quality monitor (AQM). As previously mentioned, for at least some embodiments the AQM senses a level of $CO_2$. As previously mentioned, at least some embodiments further include identifying a likelihood of fire within a structure in which the controllable receptacle is located based on either sensed motion or a lack of sensed motion, and the sensed level of CO2. As previously mentioned, for at least some embodiments the motion sensor comprises a passive infrared (PIR) sensor, and wherein identifying the likelihood of fire is further dependent on sensing of thermal heat by the PIR sensor.

Figure 7:
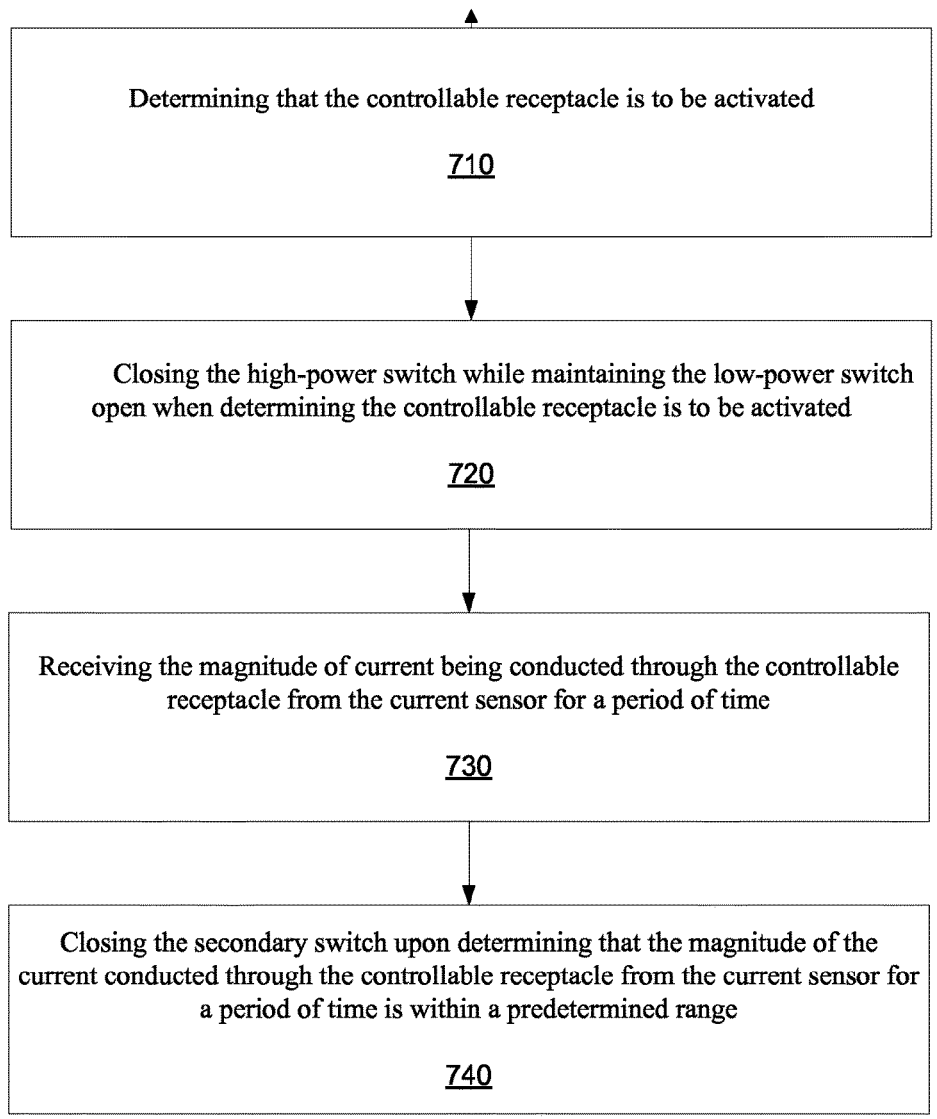
FIG. 7 is a flow chart that includes steps of a method of operating a controllable receptacle, according to an embodiment.

FIG. 7 is a flow chart that includes steps of a method of operating a controllable receptacle, according to an embodiment. For this embodiment, the controllable receptacle includes a secondary switch, wherein the secondary switch connects an input power connection received by the controllable receptacle to a receptacle output when the secondary switch is closed, a primary switch, wherein the primary switch connects the input power connection received by the controllable receptacle to the receptacle output when the primary switch is closed, and a current sensor, wherein the current sensor senses a magnitude of current conducted through the controllable receptacle. A first step 710 of the method includes determining that the controllable receptacle is to be activated. A second step 720 includes closing the primary switch while maintaining the secondary switch open when determining the controllable receptacle is to be activated. A third step 730 includes receiving the magnitude of current being conducted through the controllable receptacle from the current sensor for a period of time. A fourth step 740 includes closing the secondary switch upon determining that the magnitude of the current conducted through the controllable receptacle from the current sensor for the period of time is within a predetermined range.

As previously stated, the secondary switch is closed upon determining that the magnitude of the current conducted through the controllable receptacle 400 from the current sensor for a period of time is within a predetermined range. For an embodiment, the predetermined range includes the magnitude of the current conducted through the controllable receptacle being below a maximum threshold. For at least some embodiments, the predetermined range further includes the magnitude of the current conducted through the controllable receptacle being below the maximum threshold and above a minimum threshold.

For an embodiment, the primary switch and the secondary switch are opened if the current conducted through the controllable receptacle is above the maximum threshold. Further, for an embodiment, the primary switch and the secondary switch are maintained as open for a predetermined period of time after determining that the current conducted through the controllable receptacle is above the maximum threshold.

For at least some embodiments, after the controllable receptacle is activated, a one of the low-power switch or the high-power switch remains close until the controller determines that the controller receptacle is to be de-activated, wherein when de-activated, both the low-power switch and the high-power switch are opened. For an embodiment, the controller receptacle is de-activated if a motion sensor of the controllable receptacle does not sense motion for a predetermined period of time. For an embodiment, the controller receptacle is de-activated if a motion sensor of the controllable receptacle does not sense motion for a predetermined period of time, and other devices of a motion group of the controllable receptacle do not sense motion for the predetermined period of time.

As previously mentioned, for at least some embodiments the transceiver includes a radio. As previously mentioned, at least some embodiments further include communicating with other devices through the radio. As previously mentioned, at least some embodiments include receiving a motion indicator through the radio from at least one of the plurality of devices of the motion group. As previously mentioned, at least some embodiments include determining that the controllable receptacle is to be activated upon receiving the motion indicator from the at least one of the plurality of devices of the motion group. As previously mentioned, at least some embodiments include transmitting a motion indicator through the radio to the plurality of devices of the motion group when the controllable receptacle senses motion proximate to the controllable receptacle.

As previously mentioned, for at least some embodiments the receptacle output includes a plurality of power outputs, and wherein a power meter monitors a load of at least one of the power outputs. As previously mentioned, at least some embodiments include the power meter characterizing the load over time, and wherein the controller is further operative to identify load types and identify anomalies of load types.

Figure 8:
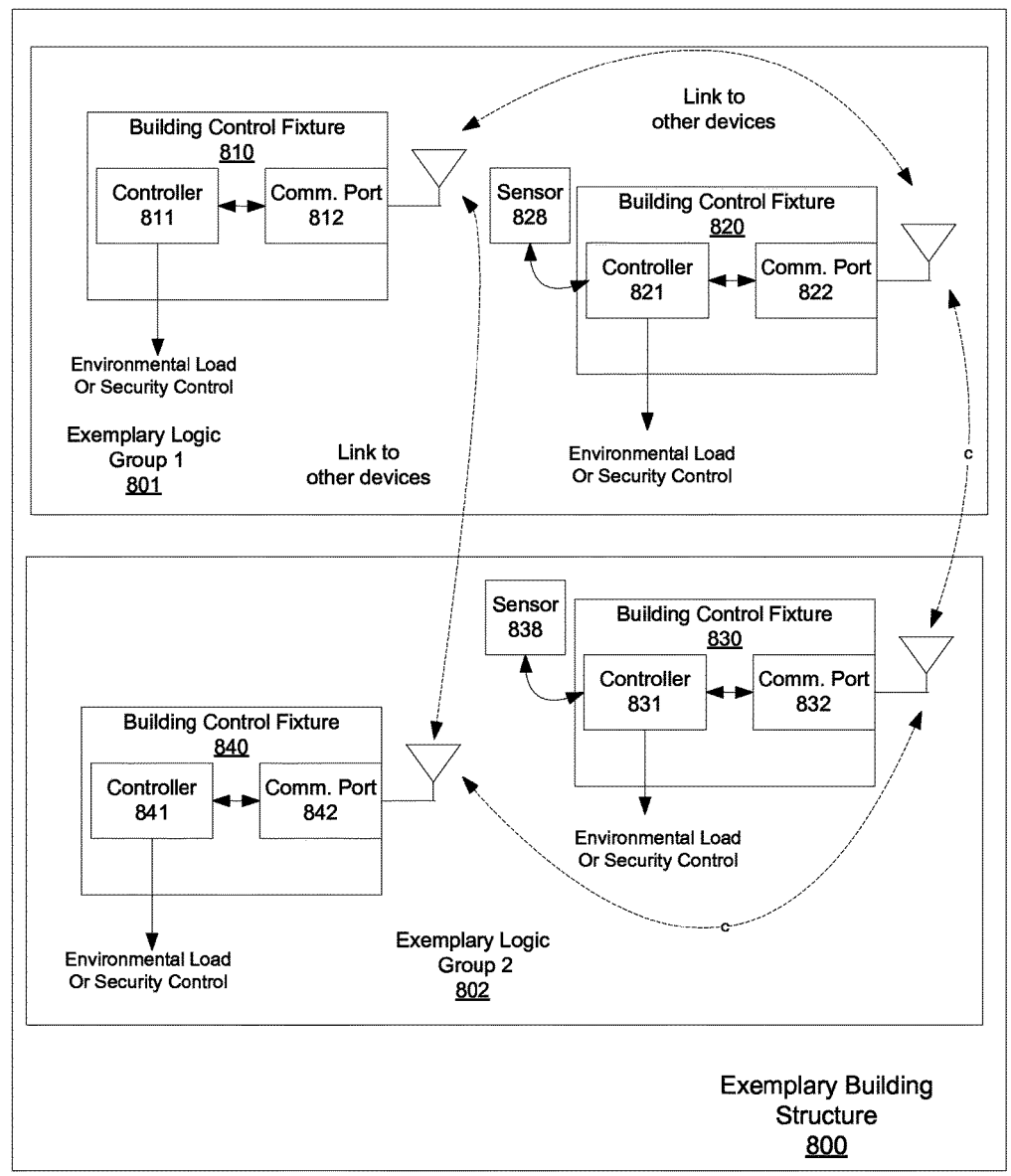
FIG. 8 shows an example of a building control system according to an embodiment.

FIG. 8 shows an example of a building control system according to an embodiment. As shown, the building control system includes a plurality of building fixtures 810, 820, 830, 840 located within, for example, a building structure 800. At least some embodiments of the building fixtures include controllable receptacles. It is to be understood that the term "building" may be used here to designate of define any structure that may include and benefit from the use of the described building fixtures, such as, any type of indoor room or structure, including, for example, a parking structure.

The building control system includes at least one sensor (such as, sensors 828, 838) interfaced with at least one of the plurality of building fixtures (such as, building fixtures 820, 830). As shown, the building fixtures 810, 820, 830, 840 each include a communication port (such as communication ports 812, 822, 832, 842) and a controller (such as, controllers 811, 821, 831, 841).

As will be described, each controller is configured to independently control at least one of an environmental load or a security device. Each controller is configured to either receive or help designate the building fixture as belonging to a logical group of building fixtures. Additionally, each controller is configured to share at least one of sensor or state information with other building fixtures within the logical group of building fixtures, through the communication port.

FIG. 8 shows exemplary logical groups 801, 802. While the logical groupings of FIG. 1 do not overlap (that is, there is not a building fixture shown as belonging to multiple logical groups), embodiments includes building fixtures belonging to one or more logical groups. As will be described, the logical groups can be dynamic and change over time.

At least some embodiments of the building fixtures (also referred to as building control apparatuses) include a device mounted to a wall or a ceiling of a building. At least some of the building fixtures include controllable receptacles that can be located on a wall. At least some embodiments of the building fixtures include power boxes. At least some embodiments of the building fixtures supply a variety of services including electrical power, light, heat, and cold air as needed.

Additionally, or alternatively, multiple of the building fixtures of a logical grouping of building fixtures contain sensors or cameras that are used to provide security and fire control systems throughout, for example, buildings.

One embodiment of a building fixture includes an intelligent light fixture. Light fixtures come in many forms with the fluorescent fixture being the most common in buildings. New fluorescent fixtures can be fitted with special ballasts that allow for dimming.

Another embodiment of a building fixture system includes arrays of ceiling fans such as are often found in buildings where the climate is warm or humid. The speed of the fans where people are present can be made faster. HVAC (heating, ventilation, and air conditioning) systems often have multiple ports in a large room. By controlling the flow or temperature of air in active areas cooling and heating costs can be reduced.

Another embodiment of a building fixture system includes an audio speaker array. By varying sound levels to match activity, audio systems can be made more effective.

Another embodiment of a building fixture system includes surveillance systems. An array of surveillance components such as microphones or cameras lend themselves to intelligent control. Activity can be monitored by the system so the fixtures can focus on areas where people happen to be located.

Another embodiment of a building fixture system includes RFID (radio frequency identification) tag reader arrays. Embodiments of RFID tag systems include badge readers lend themselves to intelligent arrays. It is possible to track and display movements of workers in a building by individual. A system of this nature can make access available to certain people while blocking others. By combining the other surveillance components above with RFID tags, any activity of any individual can be monitored in detail.

Another embodiment of a building fixture system includes a fire alarm system. That is, embodiments of the building fixture system can be used for fire alarm systems. The fixtures can sense and monitor possible fire indicators: carbon monoxide, temperature, smoke, sprinkler status, etc. The system can also check for people in a fire area, fire doors, etc. Activation of a fire alarm box can place the array into a fire mode to track or confirm the alarm in order to lock down elevators, close fire doors, and notify security. Today's fire alarm systems can be expensive to install and maintain. Using an array of intelligent building fixtures can greatly reduce installation and maintenance costs as it can be piggybacked onto an existing array.

Embodiment includes various methods of deploying the described intelligent building fixtures. Generally, four modes of deployment have been identified.

A first mode includes an installation mode. Fixtures are normally be installed by electricians. As each fixture is installed, it may be tested by powering it up. In the installation mode, each fixture responds independently with the fixture turning on or providing an audible or visual indicator when powered up.

A second mode includes a setup mode. Once the installation is finished the array of fixtures enters the setup mode. Two types of setup are possible. A first setup type is automatic. In this mode, the fixtures would learn to communicate with each other. The first step would be for each fixture to identify itself to the other fixtures in the array. The fixtures would be interconnected via a data network. Each fixture would perform a function visible to the adjacent fixtures. In this manner, it is possible to associate the address of a fixture with its physical location. Obstructions such walls would form the boundaries of each array. A typical array would include a single line 1×N (hall), or an M×N array (room). Other geometric shapes are a circle, a ring, a trapezoid, or a triangle. Stairs between floors would be also identified. Once an array of fixtures is recognized, it can later be tagged and associated with a control device, such as a switch, by a system administrator. A second setup type is manual. Manual identification of an array of fixtures would be performed by a system administrator. First, the administrator would identify a fixture using a laser pointer. The administrator would then add each fixture to an array. When the process is performed manually, the administrator would have complete control of the setup process. The administrator would identify the array and assign a switch to control it. When the administrator has finished the setup of the fixtures, he would allow the system to progress to the operational mode.

A third mode includes an operational mode. Fixtures perform as a unit in the operational mode. The arrays previously set up respond to activity or controls such as switches. In the operational mode, the fixtures execute software that has been previously selected by the administrator or downloaded from an external source. This software allows the fixtures to track movement by a person walking along a hall or through a room. Based on the movement, the fixtures tracks or illuminate the party as the party moves through the space. The operational mode also provides for simple additions or replacement of fixtures. Major changes can require the system to enter a teardown mode.

A fourth mode includes a teardown mode. The teardown mode is used when major troubleshooting, repair or changes of the array are needed. The teardown mode restores the system to the installation mode. In that mode, the array can be modified and made ready for setup.

Embodiments of the building control systems include building fixtures that are networked. In order for the fixtures to communicate they would be part of a data network. The network can be a typical wired or wireless LAN. The network can also be a specialized network such as a wireless Ad-Hoc network, or a Bluetooth network. Another type of network is a data network that communicates over the power lines. This type of network saves having to run special data wiring to each fixture. Each fixture would be assigned a MAC layer address when manufactured which would be used during setup and operation to identify the fixture.

Referring back to FIG. 8, at least one of the building control fixtures (820, 830) is interfaced with a sensor 828, 838. However, another embodiment includes the sensor being physically incorporated into at least one of the building fixtures. Various configurations of the sensor include a light sensor, a motion sensor, or an environment sensor (such as a temperature sensor or humidity sensor). It is to be understood that each sensor can include one of such listed sensors, or any combination of the listed sensors. Other possible types of sensors include, for example, a sound/noise sensor, an intrusion detection sensor, a seismic motion (or structural motion detection) and/or a voltage/current/power meter For at least some embodiments of the building control system of FIG. 8, the building control fixtures 810, 820, 830, 840 are independently operable. That is, each of the fixtures can operate completely independently, and the controller within each fixture is operable without receiving any commands from a central controller. For other embodiments, the fixtures operate in conjunction with other fixtures, such as, other fixtures within a common logical group. For this embodiment, decisions regarding building control can involve a collaborative interaction between multiple fixtures. For other embodiments, one or more fixtures are interfaced with a system controller.

For an embodiment, each controller 811, 821, 831, 841 independently control an environmental load or a security device. More specifically, the controller controls at least one of a lighting intensity, an environmental control, or a building security control. As will be described, the building control fixtures can include lighting (that is, a light in included with the fixture), and the controller of the fixture controls the intensity of light emitted from the light. Alternatively or additionally, the fixture can include environment control, such as, temperature or humidity. For this embodiment, the fixture can be interface or be a part of an HVAC system. Alternatively or additionally, the fixture can interface with or be a part of a building security system.

For at least some embodiments, the controller of each fixture is operative to independently control the environmental load and/or the security device based on at least one of shared sensor or shared state information received from at least one other of the plurality of building fixtures within the logical group. For embodiments, the environmental control includes light, temperature and/or humidity. For embodiments, the shared sensor information includes sense light, motion, temperature, humidity, and other possible sensors. For embodiments, the state information includes, for example, occupancy information, clear state timer, light fixture emitted light intensity.

A fixture may control, for example, an intensity of light emitted from the fixture based at least in part on a sensed parameter from another fixture of the logical group. A fixture may control heat or humidity based on temperature or humidity sensing of other fixtures within the logical group. A fixture may make security decisions based on parameters sensed by other fixtures of the logical group.

A factor that greatly adds to the intelligence of the distributed building control fixtures are the designations of logical groups, wherein building fixtures of a logical group control building parameters based on sensed input from other building control fixtures of the logical group.

For an embodiment, the controller within a building control fixture is operative to help designate one or more of the plurality of building fixtures as belonging to the logical group. That is, the fixtures operate in conjunction with other fixtures, such as, other fixtures within a common logical group. For this embodiment, decisions regarding building control can involve a collaborative interaction between multiple fixtures. For another embodiment, at least a sub-plurality of the plurality of building fixtures auto-determine which building fixtures are included within the logical group.

For an embodiment, fixtures auto-designate logical groups based on location and/or proximity. That is, for one example, each fixture knows their location (for example, x, y and z coordinates) and auto-designates based on a sensed input, and proximity, or a location (for example, x, y and z coordinates) of the sensor that generated the sensed input. Fixtures which are classified into certain categories (e.g. corridor, emergency) affiliate themselves with other fixtures based on commonality of category and proximity. For example, a fixture in a corridor or emergency path will receive motion sensing input from another fixture in the corridor or emergency path and, based on the fact that they are both in the same category and that they are within a distance threshold (proximity) determines that it is in the same motion group as the fixture from which input (sensed) was received.

State another way, for an embodiment, auto-determining includes at least one of the building fixtures receiving a sensed input of a different building fixture, and the at least one building fixture auto-designating itself into a logical group that includes the different building fixture based on a proximity of the at least one building fixture to the different building fixture. For a specific embodiment, the at least one building fixture determines its proximity to the different building fixture based on a three-dimensional x, y, z location of the at least one building fixture relative to a three-dimensional x, y, z location of the different building fixture.

While described in the context of auto-designating groups, it is to be understood that location or proximity information can be used by fixtures to influence operation. That is, for example, a fixture may base its operation based on logical groupings, and additionally, based on the proximity of a sensed input.

For an embodiment, an administrator specifies which of the plurality of building fixtures belong to the logical group. Generally, the administrator specification occurs at installation, and may remain static. For another embodiment, a manual operator specifies which of the plurality of building fixtures belong to the logical group. This can include the operator having a manual control (such as a switch or a set of switches) that allows the manual operator to set and control logical groupings.

An embodiment includes each of the building fixtures of the logical group additionally being operative to receive an input from a device, wherein the building fixture responds to the input if the input includes an identifier associating the input with the logical group. For this embodiment an external controller can interface with particular logical groups based on the unique identifier associated with the logical group. Associating the unique identifiers with logical groups provides for ease of scaling of the number of building fixtures. That is, for example, conventional centrally-controlled systems require either more messages or larger messages to control building fixtures, whereas including unique identifiers with logical groups provides for an efficient system in which the transmitted data doesn't grow or increase as the group grows. Additionally, the system is less reliant on and requires less use of any one communication channel, and therefore, the likelihood of failure due to communication channel use is less.

An embodiment includes building fixtures within the logical group restarting a clear-state-timer upon sensing of motion and/or light by a building fixture within the logical group. The clear-state time can be defined by an occupancy window that estimates, for example, how long a space will be occupied after sensing an occupant. That is, for example, lights can be turned on within a building or structure for a period of the clear-state-timer, which can be estimated by an occupancy window. This embodiment allows members (building fixtures) of a logical group to transition states while maintaining synchronization with each other.

An exemplary method or sequence of events of a clear-state-timer operation includes fixture in motion group detecting motion. For operation of an exemplary set of lighting fixtures, all fixtures in motion group brighten and set an occupancy window of some configured time. At the expiration of the occupancy window, the fixtures should dim/turn off. However, if during the occupancy window, some fixtures in the motion group subsequently detects motion, all fixtures in the motion group reset the occupancy window since the area covered by the motion group is still occupied. After the occupancy window expires, all fixtures dim or turn off.

For an embodiment, sensing of motion and/or light by building fixtures within the logical group within a predetermined amount of time after restarting a lighting on-time are ignored. That is, for example, sensing of light and/or motion is ignored just after lighting of the lighting fixtures. The period of time in which sensed inputs are ignored can be defined a dead-time. The dead time can reduce "chatter" between lights of a logical group. That is, multiple lights within a logical group can near-simultaneously sense a change in motion and/or light which can cause redundant or excess chatter among the lighting fixtures of the logical group.

An embodiment includes a building fixture ignores its own sensing of light and/or motion for a predetermined period of time if the building fixture receives an indication of sensing of light and/or motion from another fixture of the logical group. This process can be defined as "anti-sensing". Anti-sensing can be useful, for example, for preventing a light fixture of an office or a conference room from turning on when someone passes by outside the office or conference room.

Figure 9:
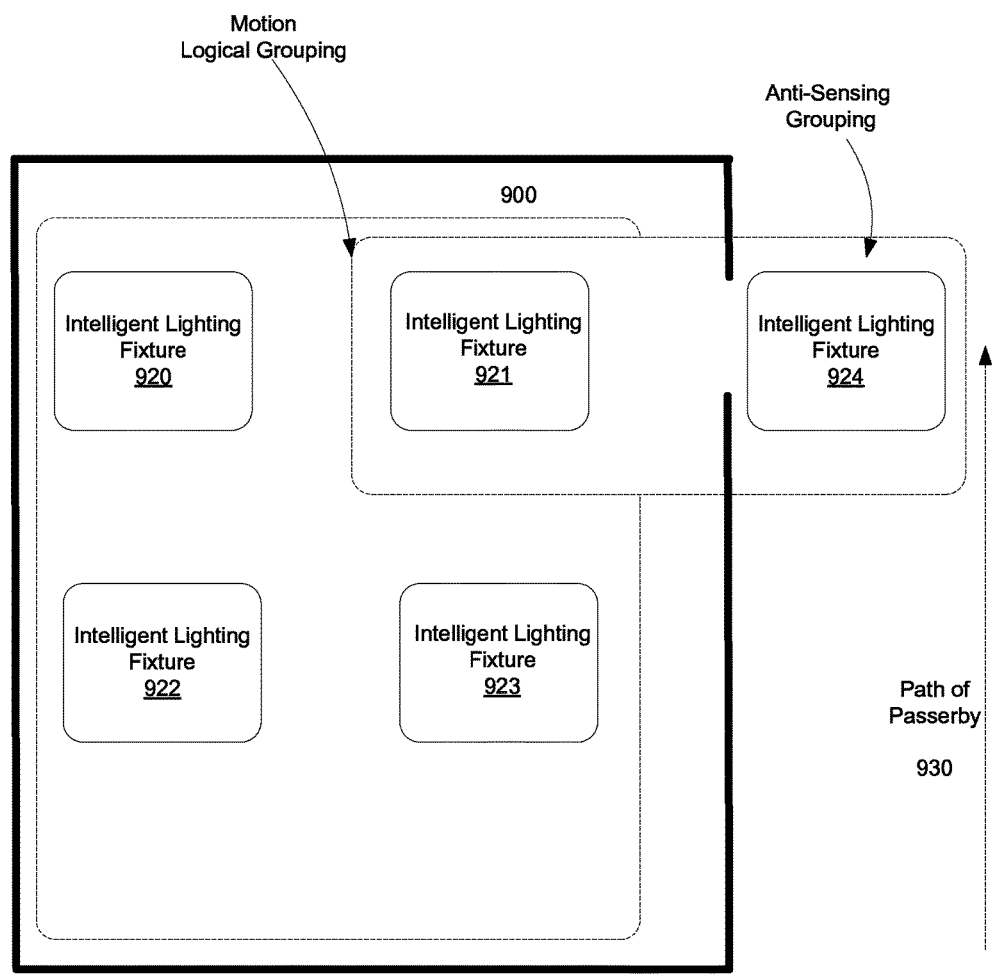
FIG. 9 shows an example of an anti-sensing group of fixtures.

FIG. 9 shows an example of an anti-sensing group of fixtures. A motion sensing group includes fixtures 920, 921, 922, 923. Also as shown, an anti-sensing group is formed that includes the fixture 921 which is location within, for example, a conference room 900, and a second fixture 924 is located outside of the conference room. For this embodiment, if both fixtures 921, 924 in the anti-sensing group detect motion, the fixture 921 in the conference room will ignore its own sensing of motion (anti-sensing) as will the other fixtures 920, 922, 923 within the motion sensing group because the detection of motion by the fixture 924 outside the room indicates that a passerby 930 triggered this motion event.

Various embodiments include different types of logical groups. Exemplary logical group types include, for example, a motion sensing group (previously mentioned), an ambient light group, a logical temperature group, and a logical switch group. Clearly, additional types of logical groups can additionally or alternatively exist. Additionally, a building fixture can belong to any number of different logical groups. Logically grouping of building fixtures is useful for synchronizing members of logical groups, normalizing behavior based on larger samples of data, and/or making better decision based on larger sample of data. Additionally, a fixture being able to belong to any number of different groups is difficult and expensive in centrally controlled systems. As the membership list of fixtures in a centrally controlled system grows, the data that the controller must manage grows, which causes scaling problems.

An exemplary motion sensing group can be utilized, for example, by lighting fixtures located in a corridor. For an embodiment, building fixtures of a corridor determining they are in a corridor, and auto-designate themselves to be included within a common logical group (that is, the motion sensing group). Further, the motion sensing group includes a corridor look-ahead behavior, wherein for the look-ahead behavior, a plurality of overlapping logical groups of building fixtures provide propagation of light along a corridor.

This propagation of light can be used in applications where objects are moving at a high speed and the path of the object's motion needs to be illuminated. Additionally, the corridor look-ahead behavior provides for a safer environment in sparsely populated hallways during the night since individuals moving through the corridor can see farther ahead. By using the corridor look-ahead behavior, the motion sensing group can achieve an effective mix of safety and energy efficiency because the appropriate level of light is provided without having to illuminate the entire corridor (as is the case with many traditional lighting control systems).

For the ambient light group, an embodiment includes at least a subset of the plurality building fixtures auto-designating themselves to be within the ambient light group. The auto or self designation of the light can be made, for example, by the at least a subset of the plurality of light determining that they receive a change of light near-simultaneously (that is, for example, within a defined time slot).

For an embodiment, if at least one of the building fixtures of the logical group sense a motion and/or light sensing blindness condition, then the at least one building fixture retrieving sensing information from other building fixtures within a common logical group to determine motion and/or ambient light level, and the building fixture responds accordingly. That is, a building fixture (such as a lighting fixture) solicits information from others in logical group if the lighting fixture is blind. It is to be understood that the same concept can be extended to other sensor as well, such as, motion sensors or temperature sensors.

For a logical switching group, an embodiment includes the logical group being designated by a group id, and building fixtures that are members of the logical group having the group id are controlled by a logical switch or a physical switch. For an embodiment, the member building fixtures are controlled to provide predetermined scenes.

For example, a conference room might have predetermined scenes which dim the fixtures near a projector screen or group viewing monitor. Other scenes can include optimizing light levels for specific tasks (for example, task tuning).

An embodiment includes at least one building fixture of the logical group receiving a reference or baseline value for at least one of motion and/or light sensor input from another building fixture in the logical group. For example, a lighting fixture solicits the ambient light level from another lighting fixture in the logical group to establish a reference for the minimum light level in a particular building location. Further, the lighting fixture may receive the input from the other fixture(s) in the group, and then compare its own measured (sensed) values against the received values to make a decision. For example, the received values could be a target (such as a heating or cooling target, and further the fixture adjusting its temperature until it reaches the target). For another embodiment, the building fixture uses the received value to determine some external factor. For example, the value received from a fixture located outside can be used to determine outside temperature which can be used to aid in adjustment of an inside temperature. Clearly, these embodiments can be extended beyond just temperature control.

For the logical temperature group, an embodiment includes a building fixture receiving at least one of an occupancy (motion) input and a temperature sensor input from at least one of the other fixtures in the logical group to control an environmental load. For other embodiments, this can further include the building fixture controlling the environmental load by averaging the temperatures of all the building fixtures in the logical group. Additionally or alternatively, embodiments include the building fixture controlling the environmental load, for example, using only the temperatures of building fixtures in the logical group which are reporting occupancy. For embodiments, the environment is controlled only in places that matter, such as, occupied spaces. The described embodiments allow from determination of whether a space is really occupied, are whether one is merely passing through the spaces.

Figure 10:
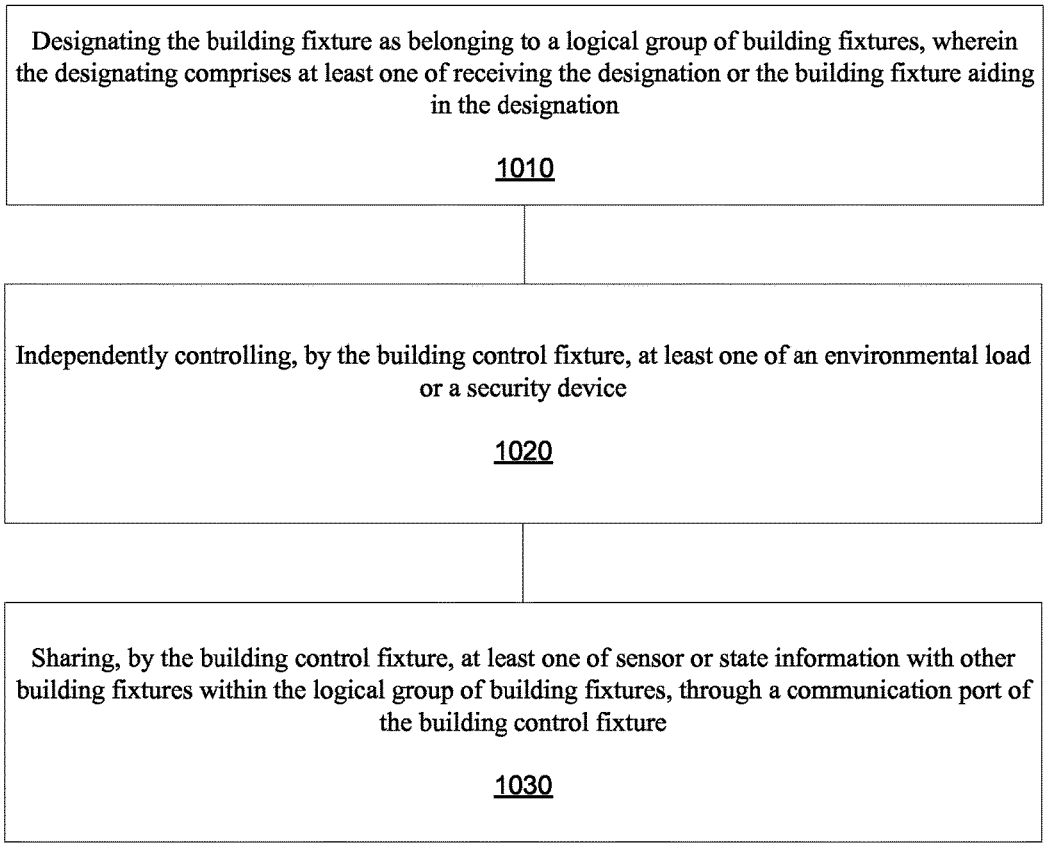
FIG. 10 is a flow chart that includes steps of an example of a method of operating a building control fixture according to an embodiment.

FIG. 10 is a flow chart that includes steps of an example of a method of operating a building control fixture according to an embodiment. A first step 1010 includes designating the building fixture as belonging to a logical group of building fixtures, wherein the designating comprises at least one of receiving the designation or the building fixture aiding in the designation. A second step 1020 includes independently controlling, by the building control fixture, at least one of an environmental load or a security device. A third step 1030 includes sharing, by the building control fixture, at least one of sensor or state information with other building fixtures within the logical group of building fixtures, through a communication port of the building control fixture.

As previously described, and embodiment further comprising the building control fixture receiving a sensor input, wherein the sensor input includes at least one of light, motion, or an environmental condition.

Figure 11:
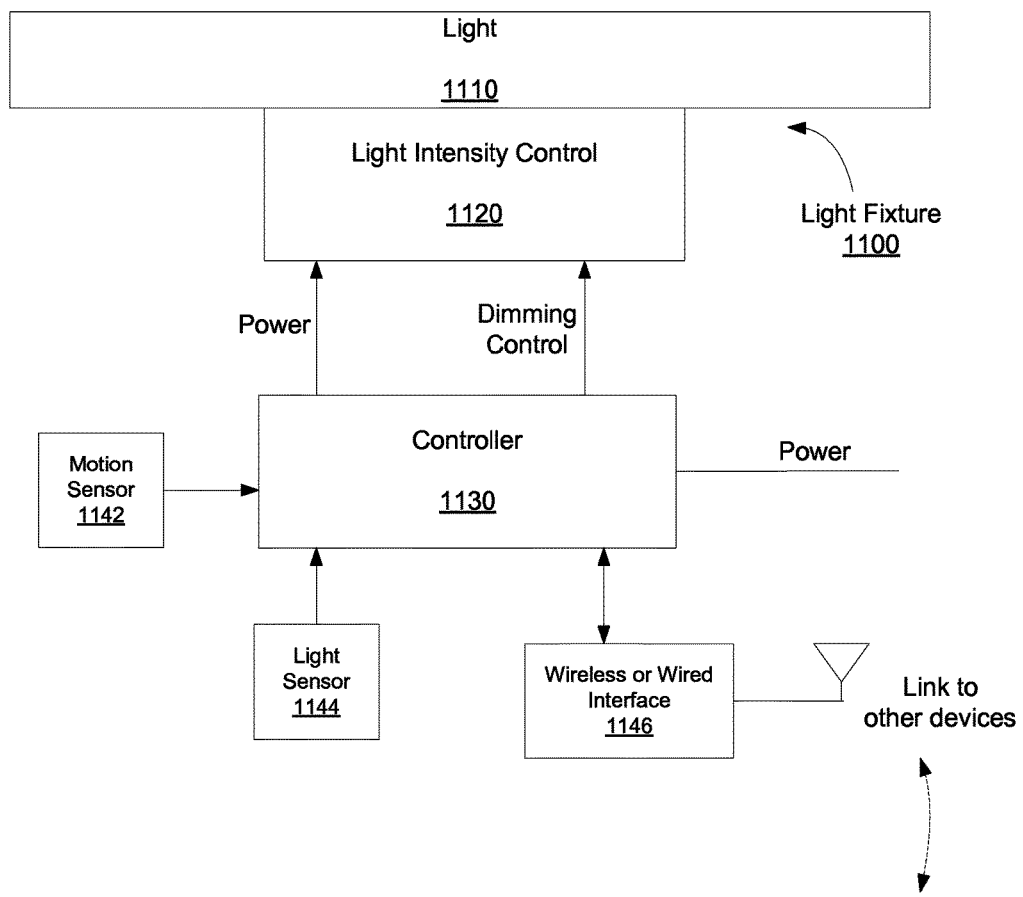
FIG. 11 shows a building fixture that provides lighting control according to an embodiment.

FIG. 11 shows an example of an intelligent lighting fixture 1100. A controller 1130 provides dimming and/or power control to a light 1110 through a light intensity control (such as, a dimming ballast) 1120. For an embodiment, the light intensity control 1120 receives a power input and a dimming control input, and provides a regulated current to the light 1110.

The intelligent light controller 1130 communicates with other devices through a wireless or wired interface 1146. The other devices include, for example, an authorized (manager) device, one or more other intelligent lighting fixtures.

As a part of, for example, an energy-savings mode of the intelligent light controller 1130, the intelligent light controller 1130 receives inputs from sensors, such as, a motion sensor 1142 and/or a light sensor 1144. Clearly, other sensors can be utilized as well.

For at least some embodiments, the light 1110 is a gas-discharge lamp, which is typically a negative-resistance device. Such devices cannot effectively regulate their current use. If such a device were connected to a constant-voltage power supply, it would draw an increasing amount of current until it was destroyed or caused the power supply to fail. To prevent this situation, a ballast (such as the dimming ballast 1120) provides a positive resistance that limits the ultimate current to an appropriate level. In this way, the ballast provides for the proper operation of the negative-resistance device by appearing to be a legitimate, stable resistance in the circuit.

Figure 12:
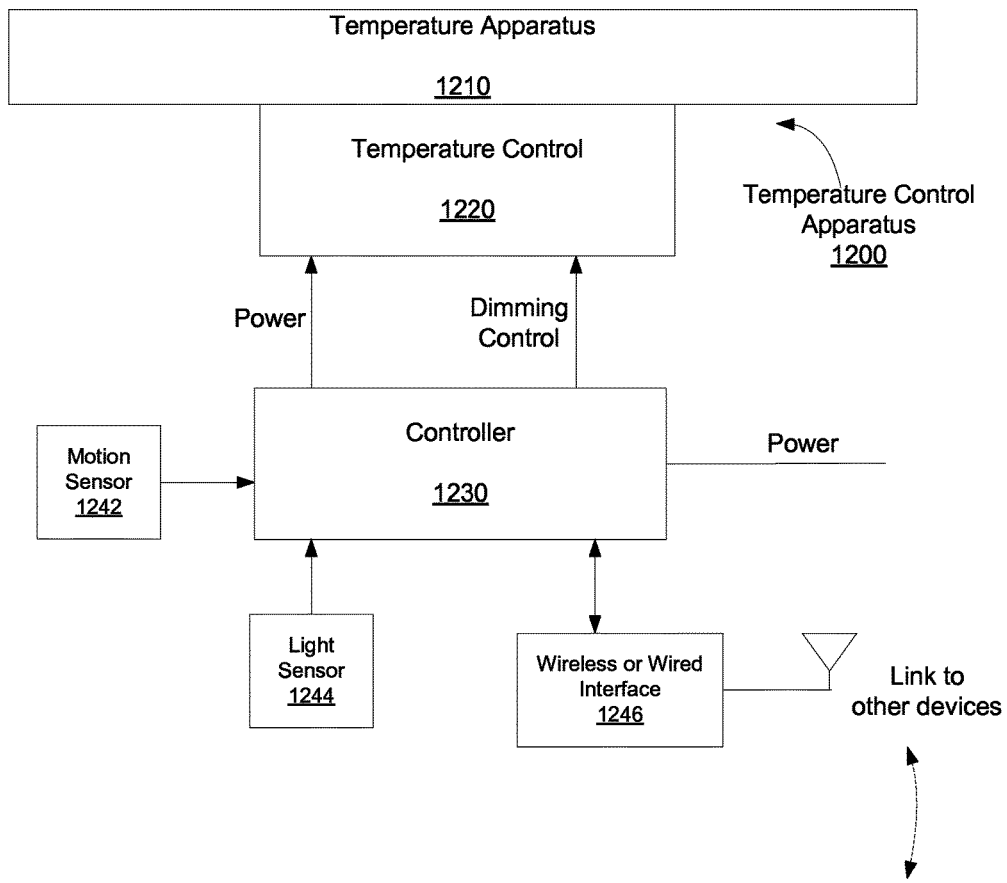
FIG. 12 shows a building fixture that provides environmental control according to an embodiment.

FIG. 12 shows an example of an intelligent temperature control apparatus 1200. The temperature control apparatus can be, for example, at least a part of a HVAC system. A controller 1230 provides temperature control to a temperature apparatus 1210 through, for example, a temperature controller 1220. This embodiment includes similar sensors 1242, 1244 and communication interface 1246.

FIG. 12 exemplifies that the logical grouping control for lighting of the described embodiments can be extended to, for example, temperature control. That is, sensing conditions, such as, temperature, motion and/or light of one temperature control apparatus can be used to aid in the control of another temperature control apparatus.

Figure 13:
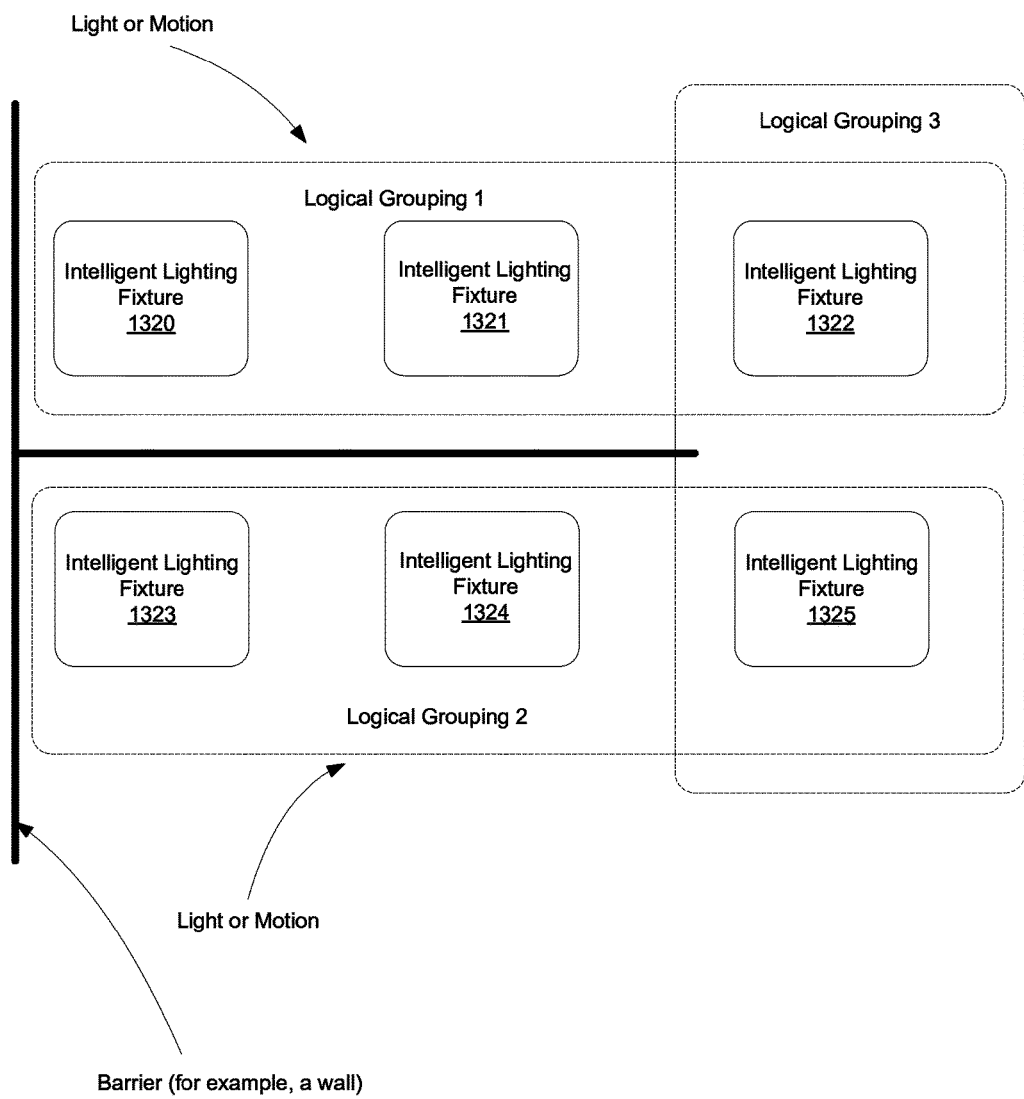
FIG. 13 shows an example of a lighting system that includes logical groupings of intelligent lighting fixtures.

FIG. 13 shows an example of a lighting system that includes logical groupings of intelligent lighting fixtures. For example, a first logical group (grouping 1) includes intelligent lighting fixtures 1320, 1321, 1322, and a second logical group (grouping 2) includes intelligent lighting fixtures 1323, 1324, 1325, and a third logical group (grouping 3) includes intelligent lighting fixtures 1322, 1325. As previously described, while the embodiment of FIG. 13 includes intelligent lighting fixtures, it is to be understood that one or more of the intelligent lighting fixtures can alternatively include the controllable receptacle of the described embodiments.

Different embodiments include the logical groupings being made in different ways. For example, the logical groupings can be made by commonality of motion and/or light sensing of the groups. The logical groupings can be predefined by a lighting system manager.

As shown in FIG. 13, an exemplary barrier, such as, a wall defines the logical groupings. For example, due to the presence of the wall, a natural logical group 1 and logical group 2 can result. That is, light or motion sensed by the members of the logical group 1 may not be sensed or be relevant to the members of the logical group 2. Additionally, a third logical group 3 may have commonality in sensing within themselves, but be different than those of logical groups 1 and 2.

For at least some embodiments, each of the intelligent light fixtures operate independently, but can receive additional information from sensors of other intelligent light fixtures within a common logical group. As shown in FIG. 13, intelligent lighting fixtures can belong to multiple logical groups. The logical groupings can be dynamic and defined in multiple ways.

A system operator can predefine logical groups, and the system operator can later change the logical groupings. Additionally, as previously described the intelligent lighting fixtures can define logical groupings themselves.

Figure 14:
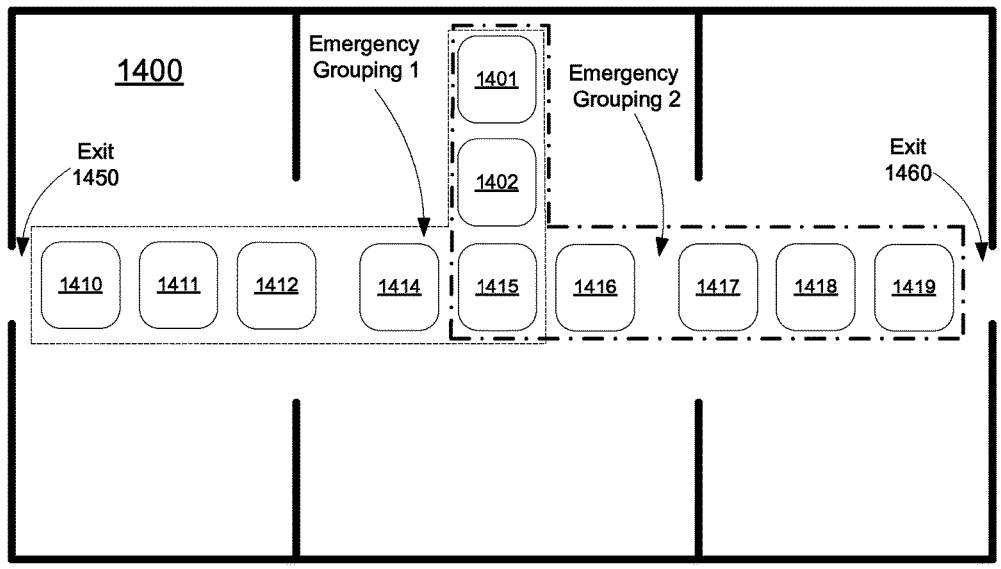
FIG. 14 shows an example of emergency path groups of fixtures.

FIG. 14 shows an example of emergency path groups of fixtures. The emergency path logical groups can be designated by any of the described methods. Once designated, the logical groupings can work individually or in combination to provide at least one indicator of a safe path for occupants of a building structure 1400. A first emergency logical group includes building fixtures 1410, 1411, 1412, 1414, 1415, 1402, 1401, while a second emergency logical grouping includes fixtures 1401, 1402, 1415, 1416, 1417, 1418, 1419. If an emergency indicator is received by one or more of the building fixtures, the building fixtures or corresponding emergency logical groups can respond. For example, lights of the emergency logical groups can flash or provide some sort of an alert to occupants of the building structure 1400 that an emergency condition exists. The emergency condition can come from anywhere (such as an internal or external sensor), and indicate any type of emergency (such as, fire, flood, smoke, earthquake, etc.). Once the emergency indicator has been received, emergency logical groups can additionally used sensors of other fixtures to deduces and determine, for example, safe exist paths for occupants. For example, if the building fixture 1419 senses heat or smoke in the vicinity of the building fixture 1419, either one or both of the emergency logical groups (1 or 2) can provide one or more indicators (such as arrows are other indicators of direction) that provide a safe path for occupants to, for example, exit 1450, or away from exit 1460. For example, the indicators can provide a safe path away from the building fixture 1419 (near exit 1460) in which smoke or heat has been sensed.

State in another way, for an embodiment, the logical groups comprise emergency path groups, and the emergency path groups respond to reception of an emergency indicator, and further respond to sensed conditions of one or more sensors of other fixtures. Further, for an embodiment, the emergency path group provides a safe path indicator for directing occupants to a safe path when the emergency indicator is received.

Figure 15:
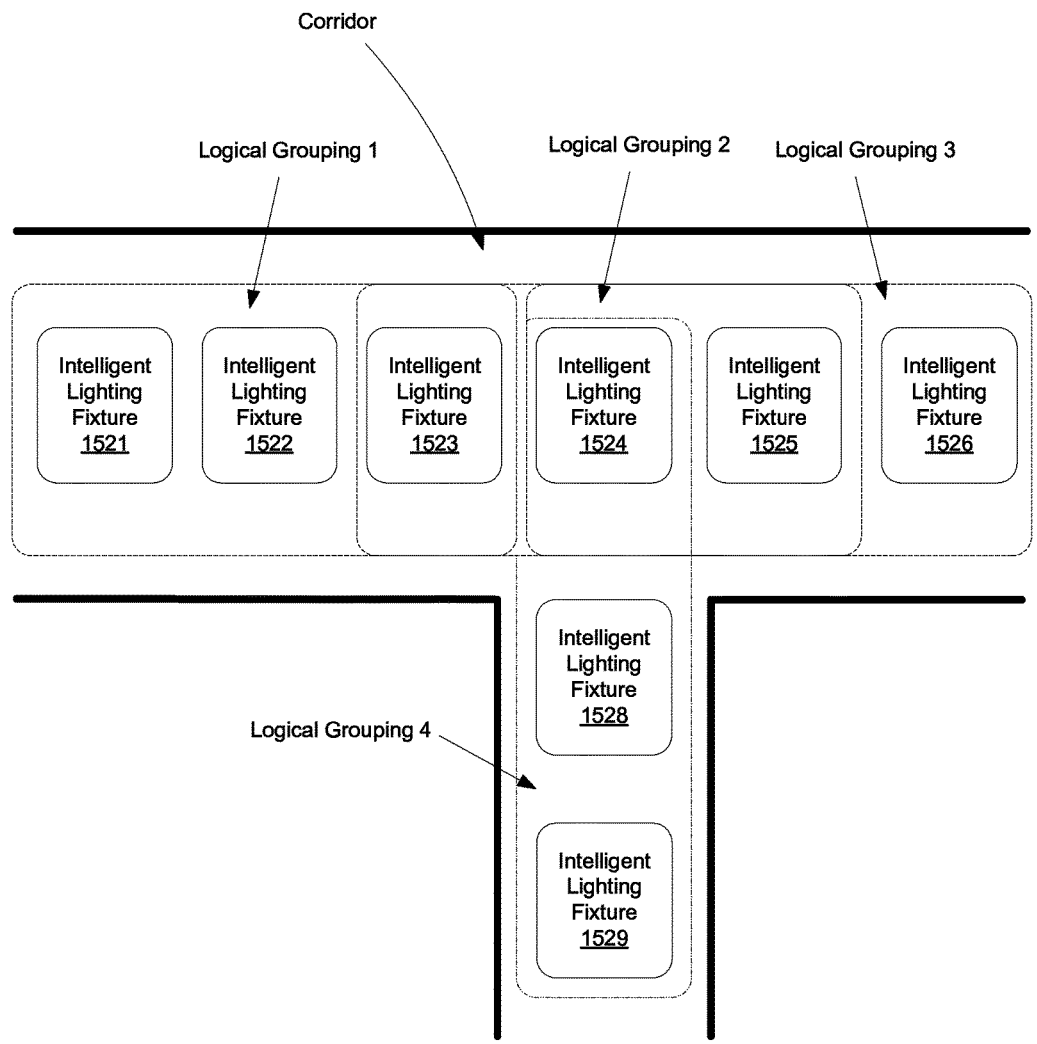
FIG. 15 shows an example of logical groupings of intelligent lighting fixtures within a corridor.

FIG. 15 shows an example of logical groupings of intelligent lighting fixtures within a corridor. As shown, a first logical grouping of intelligent lighting controllers can include intelligent lighting fixtures 1521, 1522, 1523, a second grouping of intelligent lighting controllers can include intelligent lighting fixtures 1523, 1524, 1525, a third grouping of intelligent lighting controllers can include intelligent lighting fixtures 1524, 1525, 1526, and a fourth group of intelligent lighting controllers can include intelligent lighting fixtures 1524, 1528, 1529.

As a user travels down the corridor, the intelligent lighting fixtures can each forecast the arrival of the user by utilizing information from other intelligent lighting fixtures within the same logical grouping. For example, intelligent lighting fixture 1523 can be alerted that a user is nearby and likely to be traveling near the intelligent lighting fixture 1523 through motion sensors of the intelligent lighting fixture 1521, which is in the same logical group as the lighting fixture 1523. Similarly, intelligent lighting fixture 1524 can be alerted that a user is nearby and likely to be traveling near the intelligent lighting fixture 1524 through motion sensors of the intelligent lighting fixture 1529, which is in the same logical group as the lighting fixture 1524. The control of each individual intelligent lighting fixture is made more intelligent by providing the intelligent lighting fixture with information of sensors of other intelligent lighting controllers of common logical groups.

FIG. 16 is a flow chart that includes the steps of a method of distributed lighting control according to an embodiment. A first step 1610 includes each of a plurality of independently controlled lighting fixtures sensing light and/or motion, and independently controlling an intensity of light of the lighting fixture. A second step 1620 includes specifying one or more of the plurality of independently controlled lighting fixtures as belonging to a logical group. A third step 1630 includes each of the lighting fixtures of the logical group additionally controlling the intensity of light of a lighting fixture based on sensing of light and/or motion of another lighting fixture of the logical group. As previously described, while the embodiment of FIG. 16 includes intelligent lighting fixtures, it is to be understood that one or more of the intelligent lighting fixtures can alternatively include the controllable receptacle of the described embodiments.

For at least some embodiments, at least one of the plurality of independently controlled lighting fixtures belongs to a plurality of logical groups. Further, at least some embodiments include a central system administrator that specifies which lighting fixtures belong to the logical group, while other embodiments include a manual operator that specifies which lighting fixtures belong to the logical group.

For at least some embodiments, at least a sub-plurality of the plurality of independently controlled lighting fixtures auto-determines the logical group. For example, a single switch can cause the sub-plurality of lighting fixtures to reboot. The sub-plurality of lights can detect the near-simultaneous rebooting of the sub-plurality of lights and, therefore, self or auto designate themselves as belonging to the logical group.

For at least some embodiments, lighting fixtures within the logical group restart an on time for the lighting upon sensing of motion and/or light by a lighting fixture within the logical group. Further, sensing of motion and/or light by lighting fixtures within the logical group within a predetermined amount of time after restarting a lighting on-time are ignored. That is, just after lighting of the lighting fixtures, following sensing of light and/or motion is ignored, defining a dead-time. This can reduces "chatter" between lights of a logical group. That is, multiple lights within a logical group can near-simultaneously sense a change in motion and/or light which can cause redundant or excess chatter among the lighting fixtures of the logical group.

At least some embodiments includes anti-motion, wherein if a lighting fixture receives an indication of sensing of light and/or motion from another lighting fixture, the lighting fixture ignores its own sensing of light and/or motion for a predetermined period of time.

At least some embodiments include deferral, wherein if at least one lighting fixture of a logical group senses light sensing blindness, an excessive false motion condition, or some other suspect sensor input, the lighting fixtures sensing suspect sensor input retrieve sensor input from other lighting fixtures within the logical group and ignore their own input. That is, the lighting fixtures solicit information from others in the logical group if the lighting fixtures' sensors are providing bad input.

For at least some embodiments, the logical group comprises a motion sensing group. For a specific embodiment, lighting fixtures of a corridor determine they are in a corridor, and auto-designate themselves to be included within a logical group. For a specific embodiment, the motion sensing group includes a corridor look-ahead behavior, comprising a plurality of overlapping logical groups of lighting fixtures that provide propagation of light along a corridor.

For at least some embodiments, the logical group includes an ambient light group. For a specific embodiment, at least a subset of the plurality of lights auto-designate themselves to be within a logical group. The auto or self designation of the light can be made, for example, by the subset of the plurality of lights determining that they receive a change of light near-simultaneously (within a defined time slot). For an embodiment, if at least one of the lighting fixtures of the logical group sense a light sensing blindness condition, the at least one lighting fixture retrieves sensing information from other lighting fixtures within a common logical group to determine an ambient light level, and the lighting fixture responds accordingly. That is, the lighting fixture solicits information from others in logical group if the lighting fixture is blind.

For at least some embodiments, the logical group includes a logical switch group. For a specific embodiment, the logical group is designated by a group id, and lighting fixtures that are members of the logical group having the group id are controlled by at least one of a logical switch and a physical switch, wherein the member light fixtures are controlled to provide predetermined scenes.

FIG. 17 is a flow chart that includes the steps of a method of distributed temperature control according to an embodiment. A first step 1710 includes each of a plurality of independently controlled temperature apparatuses sensing temperature, light, and/or motion, and independently controlling a temperature. A second step 1720 includes specifying one or more of the plurality of independently controlled temperature apparatuses as belonging to a logical group. A third step 1730 includes each of the temperature apparatuses of the logical group additionally controlling temperature based on sensing of temperature, light and/or motion of another temperature apparatus of the logical group. As previously described, while the embodiment of FIG. 17 includes intelligent lighting fixtures, it is to be understood that one or more of the intelligent lighting fixtures can alternatively include the controllable receptacle of the described embodiments.

Although specific embodiments have been described and illustrated, the described embodiments are not to be limited to the specific forms or arrangements of parts so described and illustrated. The embodiments are limited only by the appended claims.

What is claimed:

1. A controllable receptacle, comprising:
a primary switch, wherein the primary switch connects an input power connection received by the controllable receptacle to a receptacle output when the primary switch is closed;
a secondary switch, wherein the secondary switch connects the input power connection received by the controllable receptacle to the receptacle output when the secondary switch is closed;
a current sensor, wherein the current sensor senses a magnitude of current conducted through the controllable receptacle;
a motion sensor for sensing motion proximate to the controllable receptacle;
a transceiver for communicating with other devices;
a controller, the controller operative to;
  aid in designating the controllable receptacle as belonging to a motion group, wherein the motion group comprises a plurality of devices, wherein the controller communicates with other of the plurality of devices through the transceiver;
  receive motion sensor information from at least one of the other devices within the motion group, through the transceiver;
  determine that the controllable receptacle is to be activated based on a motion sensor of at least one of the other devices within the motion group sensing motion;
  close the primary switch while maintaining the secondary switch open when determining the controllable receptacle is to be activated;
  receive the magnitude of current being conducted through the controllable receptacle from the current sensor for a period of time; and
  close the secondary switch upon determining that the magnitude of the current conducted through the controllable receptacle from the current sensor for the period of time is within a predetermined range.

2. The controllable receptacle of claim 1, wherein the motion sensor comprises an ambient light sensor.

3. The controllable receptacle of claim 1, further comprising an air quality monitor (AQM).

4. The controllable receptacle of claim 3, wherein the AQM senses a level of $CO_2$.

5. The controllable receptacle of claim 3, wherein the controller is further operative to identify a likelihood of fire within a structure in which the controllable receptacle is located based on either sensed motion or a lack of sensed motion, and the sensed level of CO2.

6. The controllable receptacle of claim 5, wherein the motion sensor comprises a passive infrared (PIR) sensor, and wherein identifying the likelihood of fire is further dependent on sensing of thermal heat by the PIR sensor.

7. The controllable receptacle of claim 1, wherein the primary switch includes at least one of a triac, set of triacs, thyristors, IGBTs (insulated gate bipolar transistors), BJTs (bipolar junction transistors), and the secondary switch includes a relay.

8. The controllable receptacle of claim 1, wherein the predetermined range includes the magnitude of the current conducted through the controllable receptacle being below a maximum threshold.

9. The controllable receptacle of claim 8, further comprising opening the primary switch and the secondary switch if the current conducted through the controllable receptacle is above the maximum threshold.

10. The controllable receptacle of claim 9, further comprising maintaining the primary switch and the secondary switch as open for a predetermined period of time after determining that the current conducted through the controllable receptacle is above the maximum threshold.

11. The controllable receptacle of claim 8, wherein the predetermined range further includes the magnitude of the current conducted through the controllable receptacle being below the maximum threshold and above a minimum threshold.

12. The controllable receptacle of claim 1, wherein after the controllable receptacle is activated, a one of the secondary switch or the primary switch remains close until the controller determines that the controller receptacle is to be de-activated, wherein when de-activated, both the secondary switch and the primary switch are opened.

13. The controllable receptacle of claim 1, the transceiver comprises a radio.

14. The controllable receptacle of claim 13, wherein the controller is further operative to communicate with other devices through the radio.

15. The controllable receptacle of claim 14, wherein controller receives a motion indicator through the radio from at least one of the plurality of devices of the motion group.

16. The controllable receptacle of claim 15, wherein the controller is operative to determine that the controllable receptacle is to be activated upon receiving the motion indicator from the at least one of the plurality of devices of the motion group.

17. The controllable receptacle of claim 14, wherein controller is operative to transmit a motion indicator through the radio to the plurality of devices of the motion group when the controllable receptacle senses motion proximate to the controllable receptacle.

18. The controllable receptacle of claim 1, wherein the receptacle output includes a plurality of power outputs, and wherein a power meter monitors a load of at least one of the power outputs.

19. The controllable receptacle of claim 18, wherein the power meter characterized the load over time, and wherein the controller is further operative to identify load types and identify anomalies of load types.

20. A building control system, comprising:
a plurality of building fixtures, wherein at least one of the building fixtures includes a controllable receptacle, and at least one of the building fixtures does not includes the controllable receptacle;
at least one sensor interfaced with at least one of the plurality of building fixtures; wherein
the at least one of the building fixtures that does not include controllable receptacle comprises;
a communication port;
a controller, the controller configured to:
independently control at least one of an environmental load or a security device;
either receive or help designate the building fixture as belonging to a logical group of the plurality building fixtures;
share at least one of sensor or state information with other building fixtures within the logical group of the plurality of building fixtures, through the communication port;
wherein the at least one controllable receptacle includes;
a primary switch, wherein the primary switch connects an input power connection received by the controllable receptacle to a receptacle output when the primary switch is closed;
a secondary switch, wherein the secondary switch connects the input power connection received by the controllable receptacle to the receptacle output when the secondary switch is closed;
a current sensor, wherein the current sensor sense a magnitude of current conducted through the controllable receptacle;
a transceiver for communicating with other building fixtures;
at least one receptacle sensor;
a receptacle controller, the receptacle controller operative to;
aid in designating the controllable receptacle with the logical group, wherein the receptacle controller communicates with at least one of the building fixtures of the logical group through the transceiver;
receive motion sensor information from at least one of the building fixtures within the logical group, through the transceiver;
determine that the controllable receptacle is to be activated based on a motion sensor of at least one of the building fixtures within the logical group sensing motion;
close the at least one switch when determining the controllable receptacle is to be activated;
close the primary switch while maintaining the secondary switch open when determining the controllable receptacle is to be activated;
receive the magnitude of current being conducted through the controllable receptacle from the current sensor for a period of time;
close the secondary switch upon determining that the magnitude of the current conducted through the controllable receptacle from the current sensor for the period of time is within a predetermined range.

21. The building control system of claim 20, wherein the at least one sensor comprises an ambient light sensor.

22. The building control system of claim 20, wherein at least one of the plurality of building fixtures comprises an air quality monitor (AQM).

23. The building control system of claim 22, wherein the AQM senses a level of $CO_2$.

24. The building control system of claim 23, wherein the receptacle controller is further operative to identify a likelihood of fire within a structure in which the controllable receptacle is located based on either sensed motion or a lack of sensed motion, and the sensed level of CO2.

25. The building control system of claim 24, wherein the motion sensor comprises a passive infrared (PIR) sensor, and wherein identifying the likelihood of fire is further dependent on sensing of thermal heat by the PIR sensor.

* * * * *